(12) United States Patent
Heo et al.

(10) Patent No.: US 12,307,039 B2
(45) Date of Patent: May 20, 2025

(54) ELECTRONIC DEVICE INCLUDING FORCE SENSORS DISPOSED ON SAME LAYER AND METHOD FOR CONTROLLING SAME

(71) Applicant: SAMSUNG ELECTRONICS CO., LTD., Suwon-si (KR)

(72) Inventors: Hoondo Heo, Suwon-si (KR); Minuk Kim, Suwon-si (KR); Kyungtae Nam, Suwon-si (KR); Valeriy Prushinskiy, Suwon-si (KR); Sanggon Shin, Suwon-si (KR); Sunmyung Lee, Suwon-si (KR); Suk Hyun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 285 days.

(21) Appl. No.: 17/958,694

(22) Filed: Oct. 3, 2022

(65) Prior Publication Data
US 2023/0023401 A1 Jan. 26, 2023

Related U.S. Application Data

(63) Continuation of application No. PCT/KR2021/004142, filed on Apr. 2, 2021.

(30) Foreign Application Priority Data

Apr. 6, 2020 (KR) .................. 10-2020-0041733

(51) Int. Cl.
*G06F 3/041* (2006.01)
*G01L 1/00* (2006.01)
(Continued)

(52) U.S. Cl.
CPC ............ *G06F 3/04144* (2019.05); *G01L 1/00* (2013.01); *G01L 1/2262* (2013.01);
(Continued)

(58) Field of Classification Search
CPC ....... G01L 1/2281; G01L 1/00; G01L 1/2262; G01L 1/2293; G06F 3/041;
(Continued)

(56) References Cited

U.S. PATENT DOCUMENTS

2013/0076646 A1 3/2013 Krah et al.
2014/0354617 A1 12/2014 Nam et al.
(Continued)

FOREIGN PATENT DOCUMENTS

KR 10-2014-0072888 A 6/2014
KR 10-2014-0141843 A 12/2014
(Continued)

OTHER PUBLICATIONS

International Search Report dated Jul. 12, 2021 issued by the International Searching Authority in International Application No. PCT/KR2021/004142 (PCT/ISA/210).
(Continued)

*Primary Examiner* — Benjamin R Schmitt
(74) *Attorney, Agent, or Firm* — Sughrue Mion, PLLC

(57) ABSTRACT

An electronic device includes a cover window defining a front surface of the electronic device; a first sensor provided under the cover window and configured to detect a pressure applied to the cover window; a second sensor provided on a same layer as the first sensor and configured to detect the pressure applied to the cover window; a first adhesive member provided on at least one area under the second sensor, wherein the second sensor is less deformed than the first sensor by the pressure applied to the cover window provided by the first adhesive member; and a processor configured to: acquire a first pressure change amount detected by the first sensor and a second pressure change amount detected by the second sensor; and detect the pressure applied to the cover window based on the first (Continued)

pressure change amount and the second pressure change amount.

15 Claims, 27 Drawing Sheets

(51) Int. Cl.
*G01L 1/22* (2006.01)
*G06F 3/044* (2006.01)

(52) U.S. Cl.
CPC .......... *G01L 1/2281* (2013.01); *G01L 1/2293* (2013.01); *G06F 3/041* (2013.01); *G06F 3/0416* (2013.01); *G06F 3/0445* (2019.05); *G06F 2203/04105* (2013.01); *G06F 2203/04106* (2013.01)

(58) Field of Classification Search
CPC .. G06F 3/04144; G06F 3/0416; G06F 3/0445; G06F 2203/04105; G06F 2203/04106
See application file for complete search history.

(56) References Cited

U.S. PATENT DOCUMENTS

| | | |
|---|---|---|
| 2017/0003782 A1 | 1/2017 | Heo et al. |
| 2018/0024687 A1 | 1/2018 | Yang et al. |
| 2018/0293420 A1* | 10/2018 | Kim ................ H05K 1/189 |
| 2019/0061318 A1* | 2/2019 | Jung ................ H04M 1/02 |
| 2019/0121484 A1 | 4/2019 | Zhang et al. |
| 2021/0296063 A1 | 9/2021 | Bok et al. |

FOREIGN PATENT DOCUMENTS

| | | | | |
|---|---|---|---|---|
| KR | 10-2017-0003874 A | 1/2017 | | |
| KR | 10-1874786 B1 | 7/2018 | | |
| KR | 10-2020-0022942 A | 3/2020 | | |
| KR | 20200022942 A * | 8/2020 | ............ | G06F 3/02 |

OTHER PUBLICATIONS

Written Opinion dated Jul. 12, 2021 issued by the International Searching Authority in International Application No. PCT/KR2021/004142 (PCT/ISA/237).

Communication issued Feb. 12, 2025 by the Korean Intellectual Property Office in Korean Patent Application No. 10-2020-0041733.

* cited by examiner

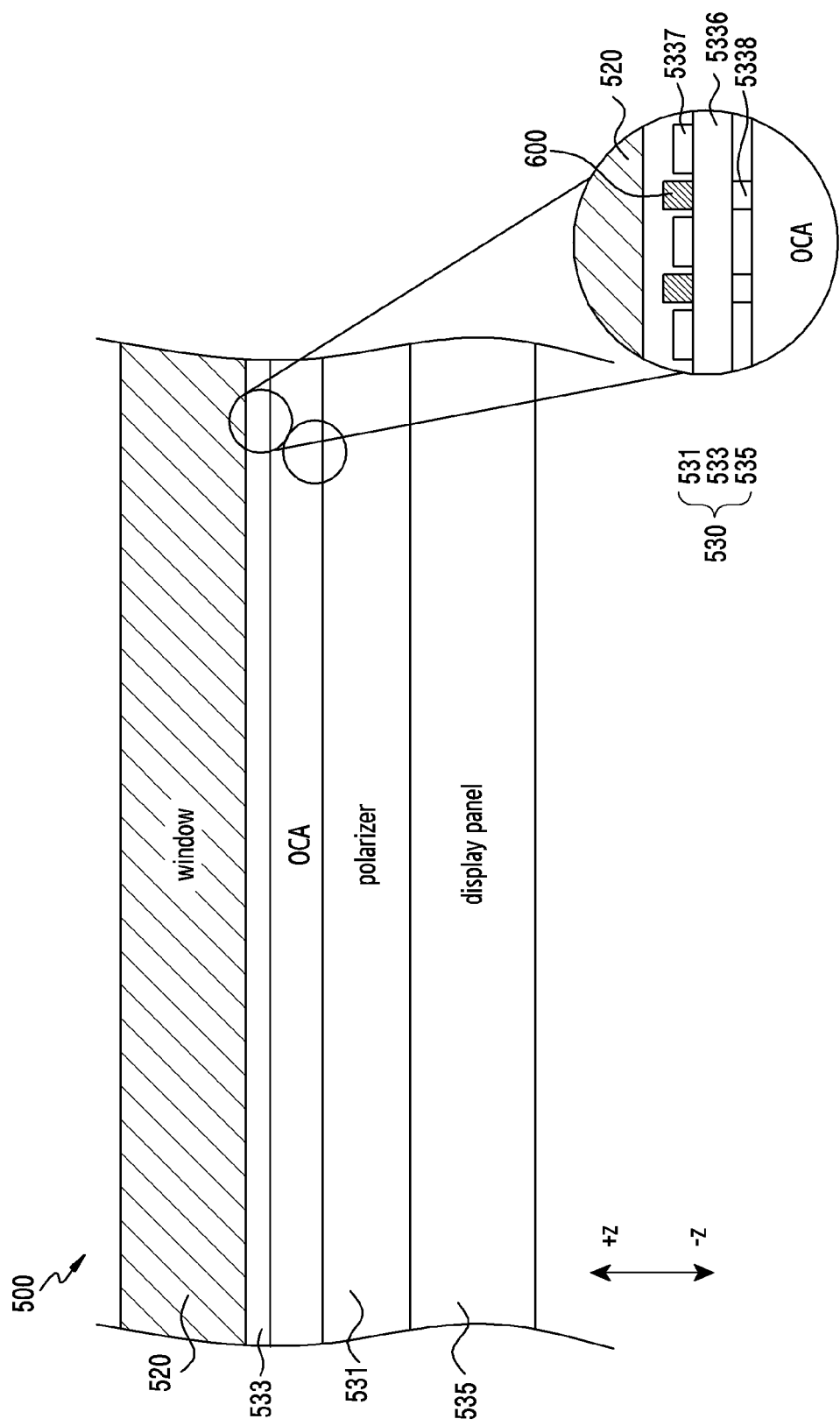

ELECTRONIC DEVICE INCLUDING FORCE SENSORS DISPOSED ON SAME LAYER AND METHOD FOR CONTROLLING SAME

CROSS-REFERENCE TO RELATED APPLICATION(S)

This application is a by-pass Continuation of International Application No. PCT/KR2021/004142, filed on Apr. 2, 2021, which is based on and claims priority to Korean Patent Application No. 10-2020-0041733, filed on Apr. 6, 2020, in the Korean Intellectual Property Office, the disclosures of which are incorporated by reference herein in their entireties.

BACKGROUND

1. Field

The disclosure relates to an electronic device including force sensors disposed on the same layer and a method for controlling the same.

2. Description of Related Art

An electronic device may include a touch screen display on which an input and an output are simultaneously generated. The electronic device may display various kinds of information on a display screen via the touch screen display, or detect a user's touch input that is input to the display to perform a function corresponding to the user's touch input.

Recent electronic devices include a force sensor capable of detecting not only a touch input that is input to a display, but also a pressure that is applied to the display, and the electronic devices may perform various functions based on the detected pressure.

An electronic device may include a force sensor that detects a pressure applied to a display. The force sensor may detect the magnitude of an input pressure based on a change in resistance generated when a metal is bent by the pressure applied to the display.

The resistance of the force sensor may also be changed by a temperature change. Accordingly, a method of disposing a plurality of force sensors on different layers has been proposed. When the force sensors are disposed on different layers, the force sensors disposed on different layers exhibit the same resistance change due to a temperature change, but exhibit different resistance changes due to a pressure. Thus, it is possible to suppress deterioration in the performance of the force sensors by temperature.

However, when a plurality of force sensors are disposed on different layers, the overall thickness of the electronic device may be increased in order to secure a mounting space for the force sensors, and manufacturing costs may increase in that process.

Accordingly, a method of disposing a plurality of force sensors on the same layer has been proposed as a method for reducing the thickness of an electronic device and reducing manufacturing costs. However, in the case of the above-described method, it is possible to reduce the thickness of the electronic device, but the difference in the change in resistance due to a pressure compared to the change in resistance due to a temperature is not large, so it is difficult to accurately detect a pressure input to the display.

SUMMARY

Provided is an electronic device capable of detecting a pressure in consideration of a pressure change due to a temperature while disposing a plurality of force sensors on the same layer.

Additional aspects will be set forth in part in the description which follows and, in part, will be apparent from the description, or may be learned by practice of the presented embodiments.

According to an aspect of the disclosure, an electronic device may include a cover window defining a front surface of the electronic device; a first sensor provided under the cover window and configured to detect a pressure applied to the cover window; a second sensor provided on a same layer as the first sensor and configured to detect the pressure applied to the cover window; a first adhesive member provided on at least one area under the second sensor, wherein the second sensor is less deformed than the first sensor by the pressure applied to the cover window provided by the first adhesive member; and a processor configured to: acquire a first pressure change amount detected by the first sensor and a second pressure change amount detected by the second sensor; and detect the pressure applied to the cover window based on the first pressure change amount and the second pressure change amount.

The electronic device may include a touch sensor provided on a same layer as the first sensor and the second sensor and configured to detect a touch input.

The processor may be further configured to detect a position at which the touch input is input based on the touch input being detected by the touch sensor, and detect the pressure applied to the cover window based on the position at which the touch input is input.

The processor may be further configured to determine a weight to be applied to the first pressure change amount and the second pressure change amount based on the position at which the touch input is input and a distance between the first sensor and the second sensor.

The processor may be further configured to apply a first weight to the first pressure change amount based on the first sensor being closer to the position at which the touch input is input than the second sensor, and apply a second weight different from the first weight to the second pressure change amount based on the second sensor being farther from the position at which the touch input is input than the first sensor.

The processor may be further configured to detect the pressure applied to the cover window based on distances between the first sensor, the second sensor and a heat source.

The processor may be further configured to determine a weight to be applied to the first pressure change amount and the second pressure change amount based on the distances between the first sensor, the second sensor, and the heat source.

The processor may be further configured to apply a first weight to the first pressure change amount based on the first sensor being closer to the heat source than the second sensor, and apply a second weight different from the first weight to the second pressure change amount based on the second sensor being farther from the heat source than the first sensor.

The heat source may include at least one of the processor and at least one integrated circuit.

The electronic device may include a third sensor configured to detect the pressure applied to the cover window, and a fourth sensor provided adjacent to the third sensor and configured to detect the pressure applied to the cover window, where the first sensor, the second sensor, the third sensor, and the fourth sensor may be provided on the same layer.

The electronic device may include a second adhesive member provided on at least one area under the fourth sensor and formed of the material having the first rigidity, where the fourth sensor may be less deformed than the first sensor or the third sensor by the pressure input to the cover window.

The electronic device may include a third adhesive member provided on at least one area under the first sensor and having a second rigidity less than the first rigidity, and a fourth adhesive member provided at least one area under the third sensor and having the second rigidity.

The cover window may include a first protrusion protruding toward the first sensor, where the first protrusion may press the first sensor due to the pressure input to the cover window.

The electronic device may include a heat dissipation sheet provided between the cover window and at least one of the first sensor and the second sensor.

The electronic device may include a bracket provided under the first sensor and the second sensor, where the bracket may include a second protrusion protruding toward the first sensor and configured to press the first sensor due to the pressure input to the cover window.

BRIEF DESCRIPTION OF DRAWINGS

The above and other aspects, features, and advantages of certain embodiments of the present disclosure will be more apparent from the following description taken in conjunction with the accompanying drawings, in which:

FIG. 5C is a diagram illustrating disposed positions of force sensors and a touch panel according to an embodiment.

DETAILED DESCRIPTION

Figure 1:
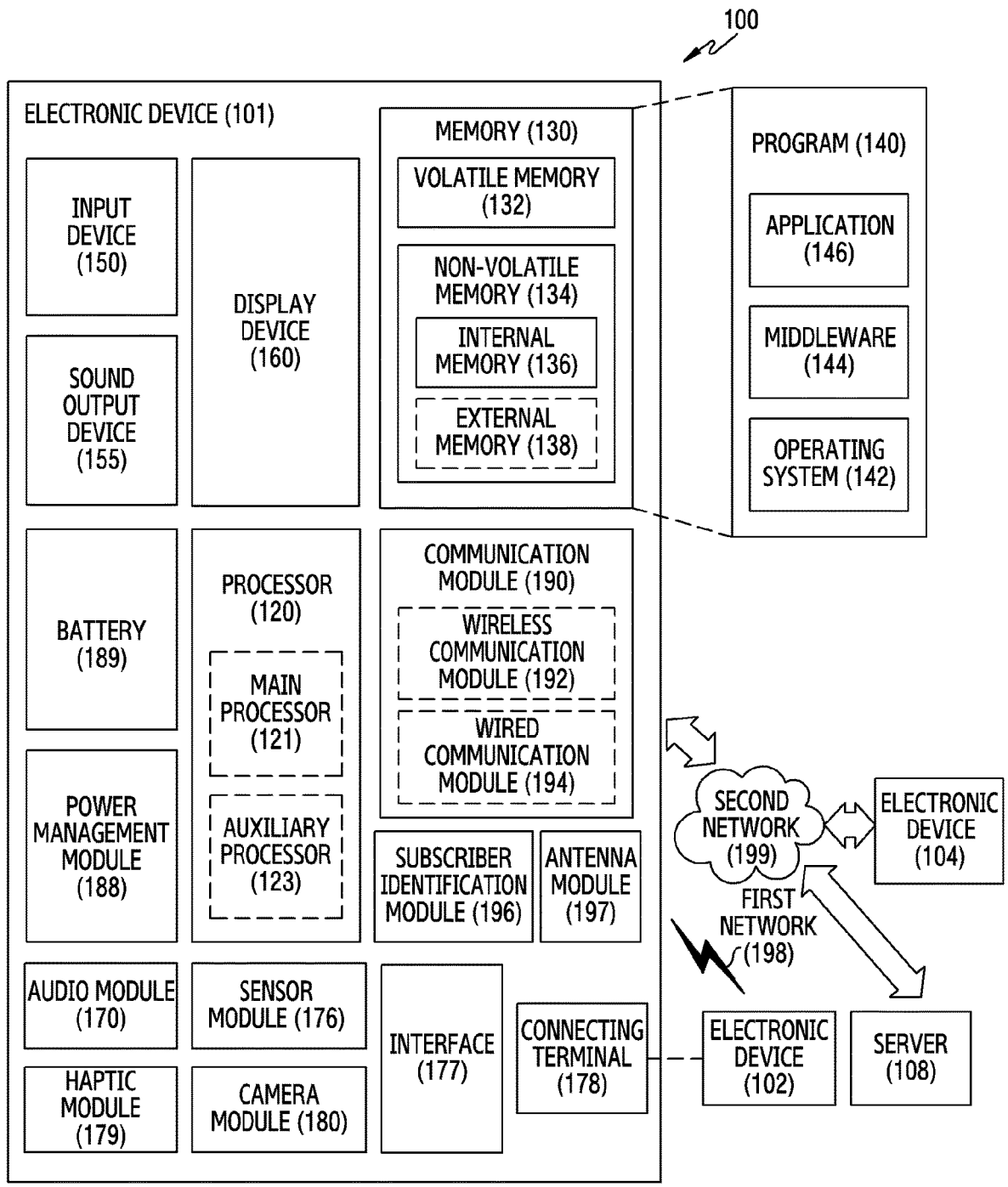
FIG. 1 is a block diagram of an electronic device according to an embodiment in a network environment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
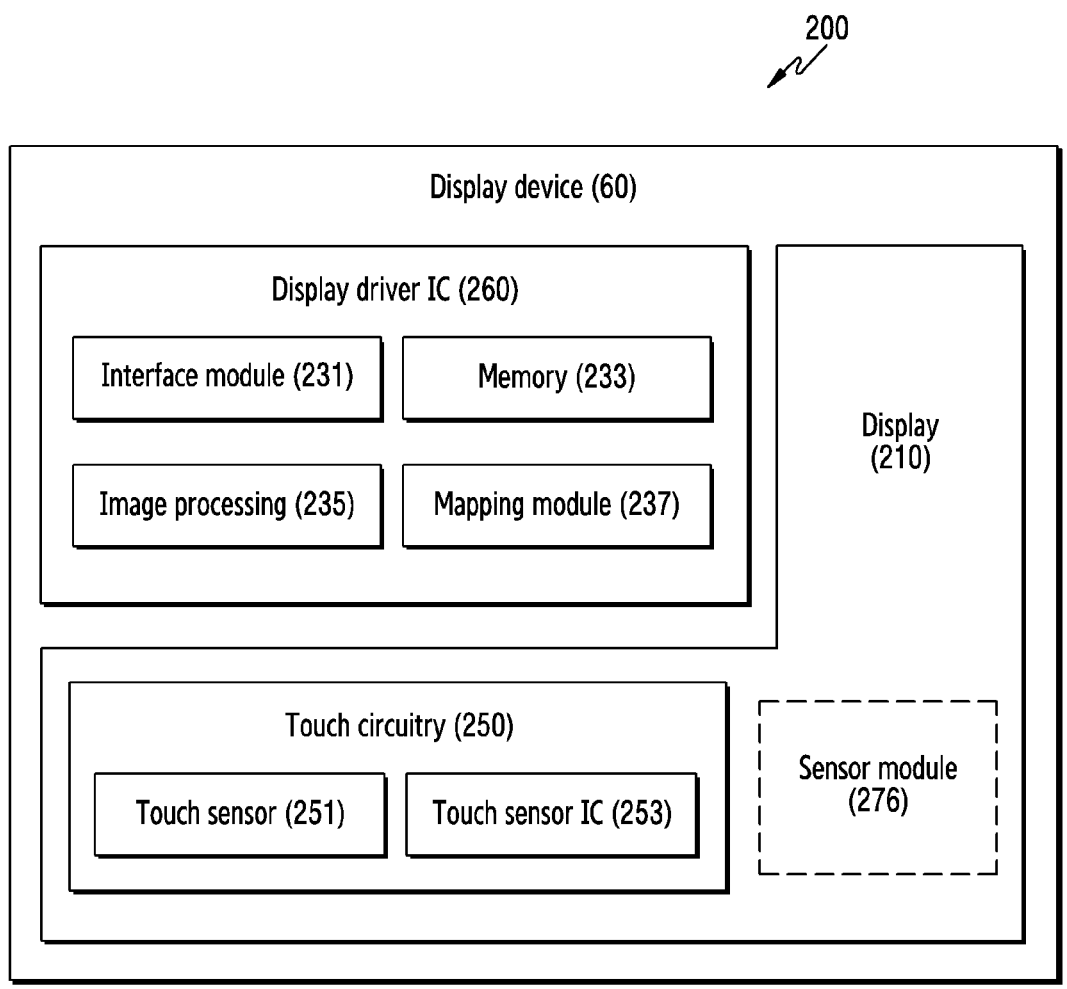
FIG. 2 is a block diagram of a display device according to an embodiment.

FIG. 2 is a block diagram 200 illustrating the display device 160 according to an embodiment. Referring to FIG. 2, the display device 160 may include a display 210 and a display driver integrated circuit (IC) (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3A:
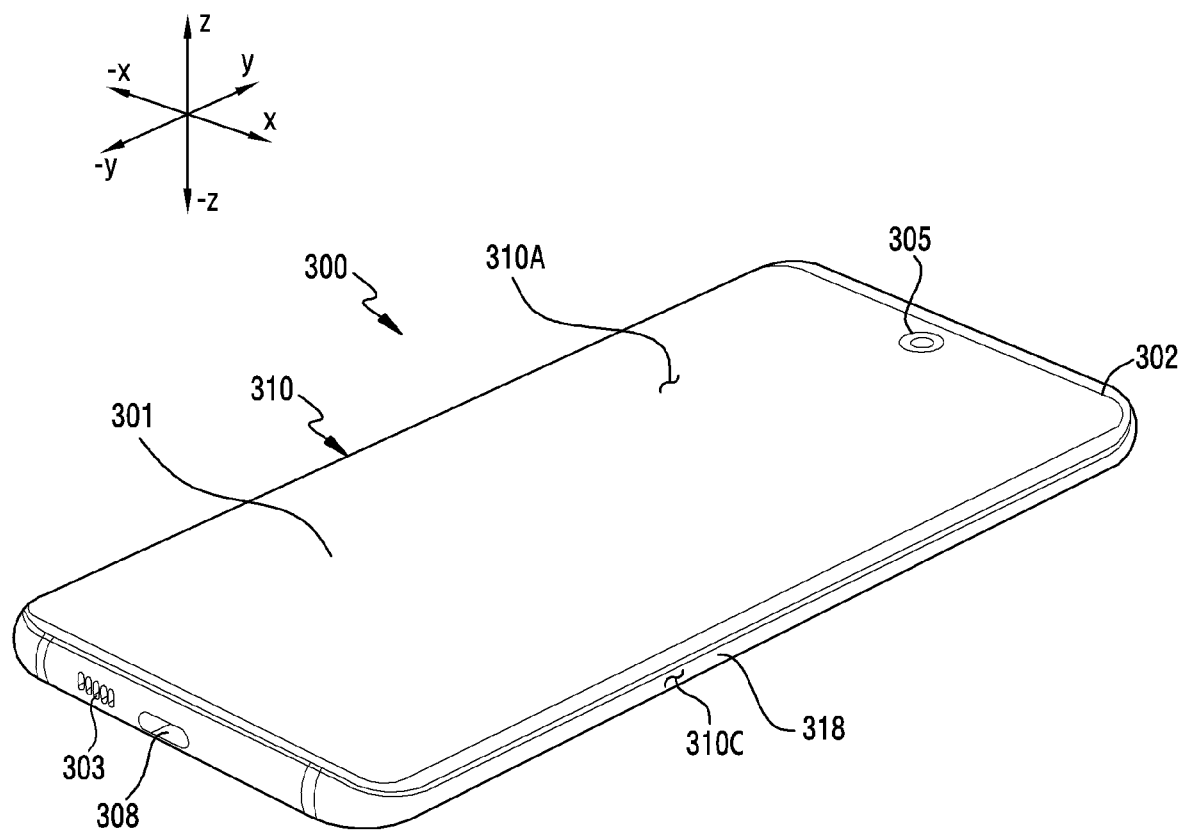
FIG. 3A is a diagram illustrating the front side of an electronic device according to an embodiment.
Figure 3B:
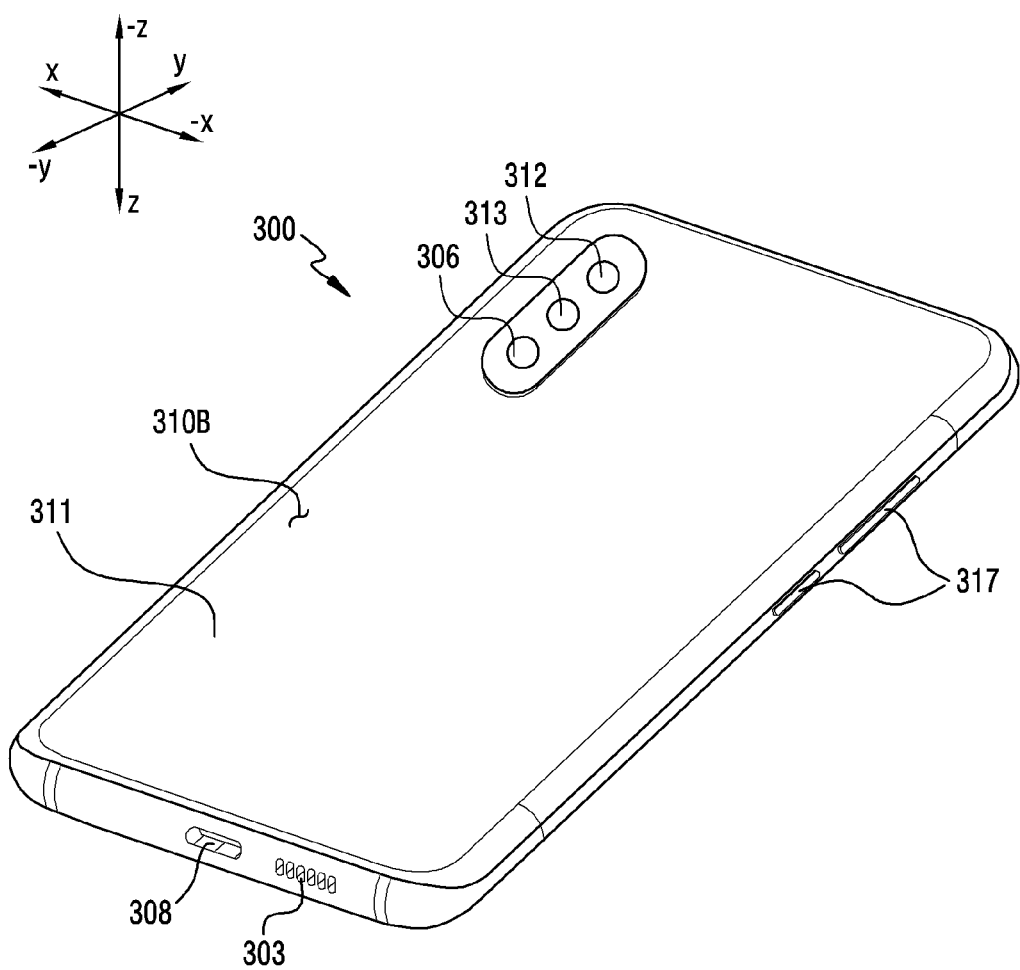
FIG. 3B is a diagram illustrating the rear side of the electronic device of FIG. 3A according to an embodiment.

FIG. 3A is a diagram illustrating an electronic device 300 according to an embodiment. FIG. 3B is a diagram illustrating the electronic device 300 of FIG. 3A viewed from the rear side according to an embodiment.

Referring to FIGS. 3A and 3B, an electronic device 300 according to an embodiment may include a housing 310 including a first surface (or a front surface) 310A, a second surface (or a rear surface) 310B, and a side surface (or a side wall) 310C surrounding the space between the first surface 310A and the second surface 310B. In another embodiment, the housing may refer to a structure defining a portion of the first surface 310A, the second surface 310B, and the side surface 310C in FIGS. 3A and 3B.

According to an embodiment, at least a portion of the first surface 310A may be defined by a substantially transparent front plate 302 (e.g., a glass plate or a polymer plate including various coating layers). According to an embodiment, the front plate 302 may include a curved portion bent and seamlessly extending from the first surface 310A toward the rear plate 311 in at least one side edge portion.

According to an embodiment, the second surface 310B may be defined by the substantially opaque rear plate 311. The rear plate 311 may be made of, for example, coated or colored glass, ceramic, polymer, metal (e.g., aluminum, stainless steel (STS), or magnesium), or a combination of two or more of these materials. According to an embodiment, the rear plate 311 may include a curved portion bent and extending seamlessly from the second surface 310B toward the front plate 302 in at least one side edge portion.

According to an embodiment, the side surface 310C may be defined by a side bezel structure (or a "side member" or a "side wall") 318 coupled to the front plate 302 and the rear plate 311 and including metal and/or polymer. In some embodiments, the rear plate 311 and the side bezel structure 318 may be integrally configured, and may include the same material (e.g., a metal material such as aluminum).

According to an embodiment, the electronic device 300 may include at least one of a display 301, an audio module 303, a sensor module, camera modules 305, 312, 313, and 306, a key input device 317, and a connector hole 308. In some embodiments, in the electronic device 300, at least one of the components (e.g., the key input device 317) may be omitted, or other components may be additionally included. For example, the electronic device 300 may include a sensor module. For example, in an area provided by the front plate 302, a sensor, such as a proximity sensor or an illuminance sensor, may be integrated into the display 301 or disposed at a position adjacent to the display 301. In some embodiments, the electronic device 300 may further include a light-emitting element, and the light-emitting element may be disposed at a position adjacent to the display 301 in the area provided by the front plate 302. The light-emitting element may provide, for example, the state information of the electronic device 300 in an optical form. In another embodiment, the light-emitting element may provide, for example, a light source that is interlocked with the operation of the camera module 305. The light-emitting element may include, for example, an LED, an IR LED, and a xenon lamp.

The display 301 may be exposed through, for example, a substantial portion of the front plate 302. In some embodiments, the edges of the display 301 may be provided to be substantially the same as the outer peripheral shape (e.g., a curved surface) of the front plate 302 adjacent thereto. In another embodiment, the distance between the periphery of the display 301 and the periphery of the front plate 302 may be substantially constant in order to increase the exposed area of the display 301. In another embodiment, a recess or an opening may be provided in a portion of a screen display area of the display 301, and other electronic components aligned with the recess or the opening, such as the camera module 305, a proximity sensor, or an illuminance sensor, may be included.

In another embodiment, at least one of camera modules 312 and 313, a fingerprint sensor, and a flash 306 may be included on the rear surface of the screen display area of the display 301. In another embodiment, the display 301 may be coupled to or disposed adjacent to a touch-sensitive circuit, a pressure sensor (or a "force sensor") capable of measuring the intensity of a touch (pressure), and/or a digitizer that detects an electromagnetic-field-type stylus pen.

The audio modules 303 and 314 may include a microphone hole and a speaker hole. The microphone hole may include a microphone disposed therein so as to acquire external sound. In some embodiments, multiple microphones may be disposed in the microphone hole so as to detect the direction of sound. In some embodiments, the speaker hole and the microphone hole may be implemented as a single hole, or a speaker may be included without a speaker hole (e.g., a piezo speaker). The speaker hole may include an external speaker hole and a call receiver hole 314.

By including a sensor module, the electronic device 300 may generate an electrical signal or data value corresponding to an internal operating state or an external environmental condition. The sensor module may further include, for example, a proximity sensor disposed on the first surface 310A of the housing 310, a fingerprint sensor incorporated in or disposed adjacent to the display 301, and/or a biometric sensor (e.g., an HRM sensor) disposed on the second surface 310B of the housing 310. The electronic device 300 may further include at least one of sensor modules, such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312, 313, and 306 may include a first camera device 305 disposed on the first surface 310A of the electronic device 300, and second camera devices 312 and 313 and/or a flash 306 disposed on the second surface 310B of the electronic device 305. The camera modules 305, 312, and 313 may include one or more lenses, an image sensor, and/or an image signal processor. The flash 306 may include, for example, a light-emitting diode or a xenon lamp. In some embodiments, two or more lenses (e.g., an infrared camera lens, a wide-angle lens, and a telephoto lens) and image sensors may be disposed on one surface of the electronic device 300.

The key input devices 317 may be disposed on the side surface 310C of the housing 310. In another embodiment, the electronic device 300 may not include some or all of the above-mentioned key input devices 317, and a key input device 317, which is not included, may be implemented in another form, such as a soft key, on the display 301. In some embodiments, the key input devices may include at least a portion of a fingerprint sensor disposed on the second surface 310B of the housing 310.

The connector hole 308 may accommodate a connector configured to transmit and receive power and/or data to and from an external electronic device and a connector configured to transmit and receive an audio signal to and from an external electronic device. For example, the connector hole 308 may include a USB connector or an earphone jack.

Figure 3C:
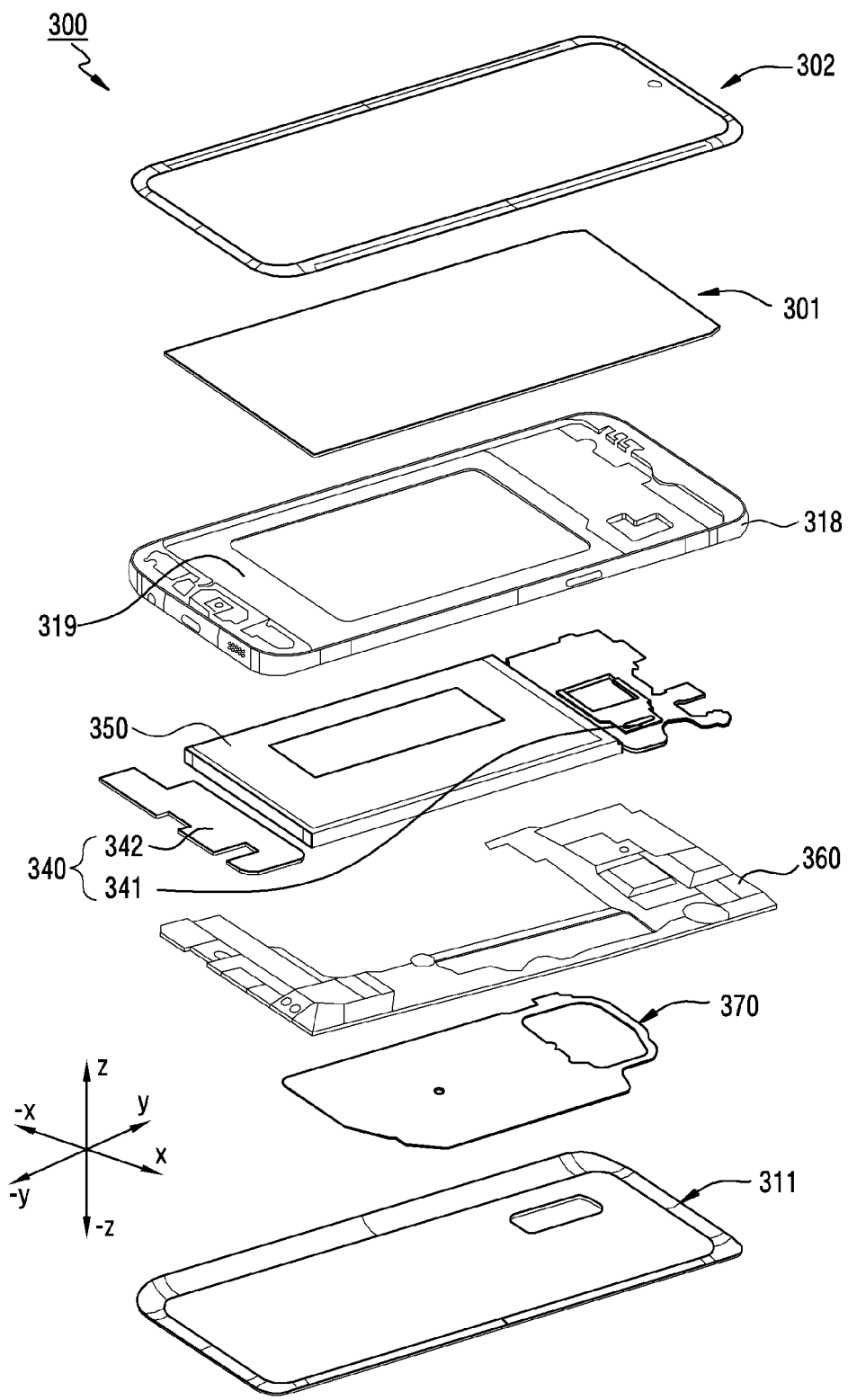
FIG. 3C is a diagram of the electronic device according to an embodiment.

FIG. 3C is a diagram of the electronic device 300 according to an embodiment.

Referring to FIG. 3C, the electronic device 300 (e.g., the electronic device 300 in FIGS. 3A and 3B) according to an embodiment may include a display 301 (e.g., the display 201 in FIG. 3A), a front plate 302 (e.g., the front plate 302 in FIG. 3A) (or a "cover window"), a rear plate 311 (e.g., the rear plate 311 in FIG. 3B), a side bezel structure 318 (e.g., the side bezel structure 318 in FIG. 3A), a first support member 319, a printed circuit board 340, a battery 350, a second support member 360 (e.g., a rear case), and/or the antenna 370. According to an embodiment, in the electronic device 400, at least one of the above-described components (e.g., the first support member 411 or the second support member 460) may be omitted, or other components may be additionally included. At least one of the components of the electronic device 300 according to an embodiment may be the same as or similar to at least one of the components of the electronic device 101 of FIG. 1 or the electronic device 300 of FIGS. 3A and 3B, and overlapping descriptions thereof will be omitted below.

According to an embodiment, the first support member 319 may be disposed inside the electronic device 300 to be connected to the side bezel structure 318, or may be integrally configured with the side bezel structure 318. The first support member 319 may be made of, for example, a metal material and/or a non-metal (e.g., a polymer) material. The display 301 may be coupled to one surface of the first support member 319, and the printed circuit board 340 may be coupled to the other surface of the first support member 319.

According to an embodiment, on the printed circuit board 340, a processor, a memory, and/or an interface may be mounted. The processor may include, for example, one or more of a central processing unit, an application processor, a graphics processing unit, an image signal processor, a sensor hub processor, or a communication processor. The memory may include, for example, a volatile memory or a nonvolatile memory. The interface may include, for example, an HDMI, a USB interface, an SD card interface, and/or an audio interface. The interface may electrically or physically connect, for example, the electronic device 300 to an external electronic device, and may include a USB connector, an SD card/an MMC connector, or an audio connector.

In an example, the printed circuit board 340 may include a first printed circuit board 341 and a second printed circuit board 342 connected to the first printed circuit board 341 via a connector. However, the printed circuit board 340 of the disclosure is not limited to the above-described embodiment, and a printed circuit board 340 according to another embodiment may be configured as a single board. In an example, the printed circuit board 340 may be disposed on the same plane as the battery 350, and the printed circuit board 340 and the battery 350 may be disposed to avoid each other or to partially overlap each other.

According to an embodiment, the battery 350 is a device for supplying power to at least one component of the electronic device 300, and may include, for example, a non-rechargeable primary battery, a rechargeable secondary battery, or a fuel cell. At least a portion of the battery 350 may be disposed on substantially the same plane as, for example, the printed circuit board 340. The battery 350 may be integrally disposed inside the electronic device 300, or may be detachably disposed on the electronic device 300.

According to an embodiment, the antenna 370 may be disposed between the rear plate 311 and the display 350. In an example, the antenna 370 may include a near field communication (NFC) antenna, a wireless charging antenna, and/or a magnetic secure transmission (MST) antenna. The antenna 370 may perform short-range communication with, for example, an external electronic device, or may transmit/ receive power required for charging to/from the external device in a wireless manner. In another embodiment, an antenna structure may be configured by a portion of the side bezel structure 318 and/or the first support member 319, or a combination thereof.

In an embodiment, the rear plate 311 may define the rear surface (e.g., the second surface 310B in FIG. 3B) of the electronic device 300. The rear plate 311 may protect the electronic device 300 from an external impact or foreign substances.

Figure 4A:
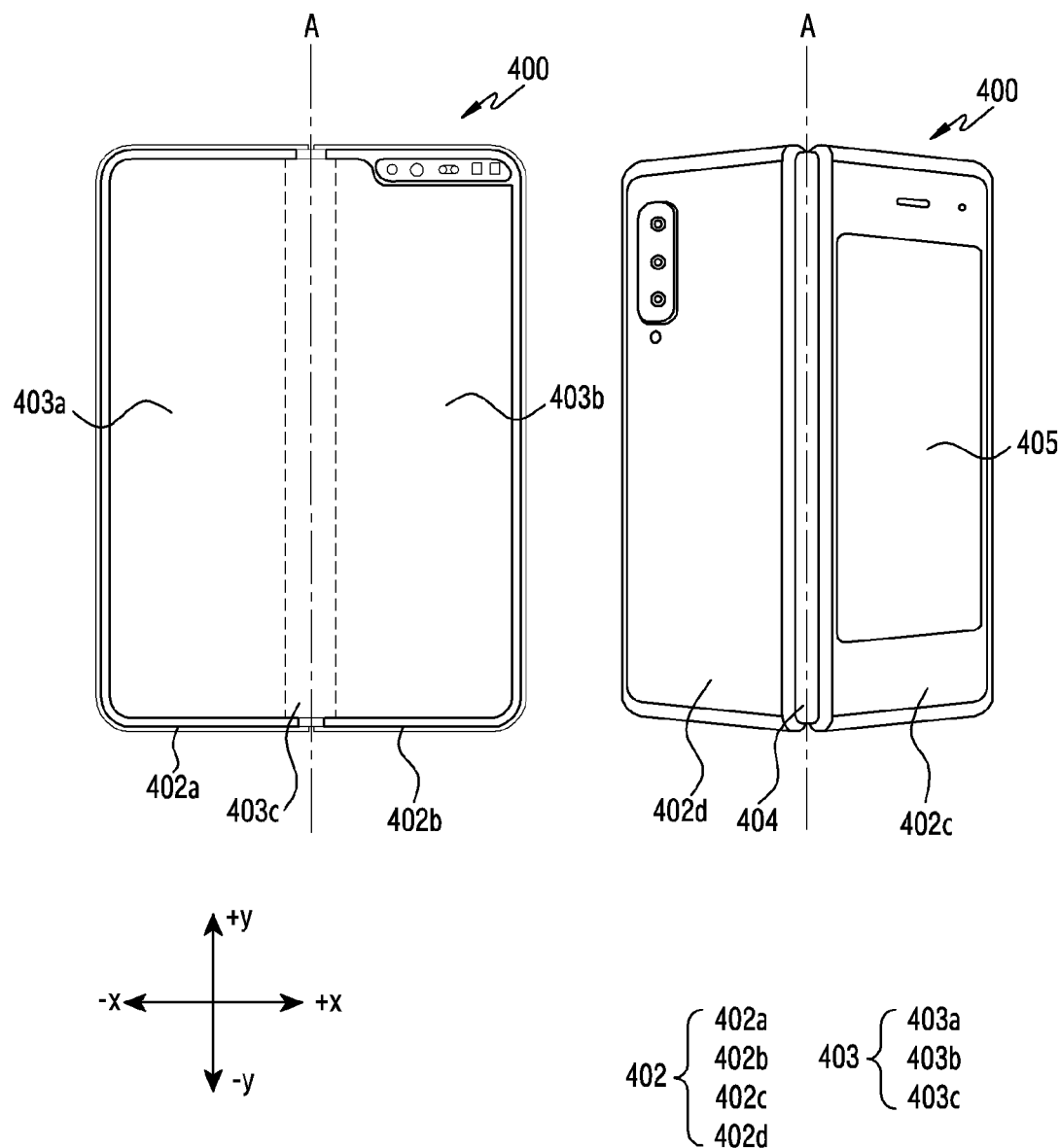
FIG. 4A is a diagram of an electronic device according to an embodiment.

FIG. 4A is a diagram of an electronic device 400 according to an embodiment.

Referring to FIG. 4A, the electronic device 400 according to another embodiment may include a foldable housing 402, a hinge cover 404 configured to cover the foldable portion of the foldable housing 402, and a flexible or foldable display 403 (hereinafter, referred to as a "display" 403 for short) disposed in a space defined by the foldable housing 402. In the disclosure, the surface on which the display 403 is disposed is defined as a first surface or a front surface of the electronic device 400, and the surface facing away from the first surface or the front surface is defined as a second surface or a rear surface of the electronic device 400. In addition, a surface surrounding the space between the front surface and the rear surface is defined as a third surface or a side surface of the electronic device 400.

According to an embodiment, the foldable housing 402 may include a first housing structure 402a, a second housing structure 402b, a first rear cover 402c, and a second rear cover 402d. In an example, the first housing structure 402a and the first rear cover 402c may be integrally configured, and the second housing structure 402b and the second rear cover 402d may be integrally configured.

In an example, the first housing structure 402a and the second housing structure 402b may be disposed on opposite sides about the folding axis (the axis A), and may have a generally symmetrical shape with respect to the folding axis (the axis A). In another example, the angle or distance between the first housing structure 402a and the second housing structure 402b may vary depending on whether the electronic device 400 is in an unfolded state (or a "flat state"), a folded state, or an intermediate state. In another example, the first housing structure 402a and the second housing structure 402b may define together a recess for receiving the display 403, and the display 403 may be disposed in the above-mentioned recess. At least a portion of the above-mentioned first housing structure 402a and at least a portion of the second housing structure 402b may be formed of a metal material or a non-metal material having rigidity of a level selected in order to support the display 403.

In an example, the first rear cover 402c may be disposed on one side of the folding axis (the axis A) of the rear surface of the electronic device 400. For example, the first rear cover 402c may have a substantially rectangular periphery, and the periphery described above may be surrounded by the first housing structure 402a. In another example, the second rear cover 402d may be disposed on the other side of the folding axis (the axis A) of the rear surface of the electronic device 400, and the edges thereof may be surrounded by the second housing structure 402b.

In an example, the first rear cover 402c and the second rear cover 402d may have substantially symmetrical shapes with respect to the folding axis (the axis A). However, the shapes of the first rear cover 402c and the second rear cover 402d are not limited to mutually symmetrical shapes, and in another embodiment, the electronic device 400 may include a first rear cover 402c and a second rear cover 402d having various shapes. In another embodiment, the first rear cover 402c may be integrated with the first housing structure 402a, and the second rear cover 402d may be integrated with the second housing structure 402b.

In an example, the first rear cover 402c, the second rear cover 402d, the first housing structure 402a, and the second housing structure 402b may define a space in which various components of the electronic device 400 (e.g., a printed circuit board and/or a battery) may be disposed. In an embodiment, one or more components may be disposed or visually exposed on the rear surface of the electronic device 400. For example, at least a portion of a sub-display 405 may be visually exposed through at least one area of the first rear cover 402c. In another embodiment, one or more components or sensors may be visually exposed through at least one area of the second rear cover 402d. The above-described sensors may include, for example, a proximity sensor and/or a rear camera, but are not limited thereto.

According to an embodiment, the electronic device 400 may further include a hinge cover 404. In an example, the hinge cover 404 may be disposed between the first housing structure 402a and the second housing structure 402b and configured to cover an internal component (e.g., a hinge structure). In an embodiment, the hinge cover 404 may be covered by a portion of the first housing structure 402a and a portion of the second housing structure 402b or exposed to the outside depending on whether the electronic device 400 is in the unfolded state (flat state) or in the folded state. For example, when the electronic device 400 is in the unfolded state, the hinge cover 404 may not be exposed by being covered by the first housing structure 402a and the second housing structure 402b. As another example, when the electronic device 400 is in the folded state (e.g., the fully folded state), the hinge cover 404 may be exposed to the outside between the first housing structure 402a and the second housing structure 402b. As another example, when the first housing structure 402a and the second housing structure 402b are in the intermediate state of being folded with a certain angle, the hinge cover 404 may be partially exposed to the outside between the first housing structure 402a and the second housing structure 402b. However, the area exposed in this case may be smaller than that in the fully folded state. In an example, the hinge cover 404 may include a curved surface for protecting the internal configuration of the electronic device 400, but is not limited thereto.

In an example, the display 403 may be disposed on a space defined by the foldable housing 402. For example, the display 403 may be seated on a recess defined by the first housing structure 402a and/or the second housing structure 402b of the foldable housing 402, and may constitute most of the front surface of the electronic device 400. Accordingly, the front surface of the electronic device 400 may include the display 403, and a partial area of the first housing structure 402a and a partial area of the second housing structure 402b, which are adjacent to the display 403. In addition, the rear surface of the electronic device 400 may include a first rear cover 402c, a partial area of the first housing structure 402a adjacent to the first rear cover 402c, a second rear cover 402d, and a partial area of the second housing structure 402b adjacent to the second rear cover 402d.

In an example, the display 403 may be a display in which at least one area is deformable into a flat shape or a curved shape. According to an embodiment, the display 403 may include a folding area 403c, a first area 403a disposed on one side with respect to the folding area 403c (e.g., one side in the −x direction of FIG. 4A), and a second area 403b disposed on the other side (e.g., one side in the +x direction in FIG. 4A).

The division of areas of the display 403 illustrated in FIG. 4A is exemplary, and the display 403 may be divided into a plurality (e.g., two, four, or four or more) areas depending on the structure or functions thereof. In an example, in the embodiment illustrated in FIG. 4A, the area of the display 403 may be divided by the folding area 403c or the folding axis (the axis A) extending parallel to the +y axis, but, in another embodiment, the display 403 may be divided based on another folding area (e.g., a folding area parallel to the +x axis) or another folding axis (e.g., a folding axis parallel to the +x axis).

In an example, when the electronic device 400 is in the unfolded state (a flat state), the first housing structure 402a and the second housing structure 402b may be oriented in the same direction while forming an angle of 180 degrees therebetween. In another example, the surface of the first area 403a and the surface of the second area 403b of the display 403 may form 180 degrees with each other and may be oriented in the same direction (e.g., toward the front side of the electronic device 400). In addition, the folding area 403c may form the same plane as the first area 403a and the second area 403b.

In another example, when the electronic device 400 is in the folded state, the first housing structure 402a and the second housing structure 402b may be disposed to face each other. The surface of the first area 403a and the surface of the second area 403b of the display 403 may face each other while forming a narrow angle (e.g., an angle between 0 and 10 degrees) relative to each other. At least a portion of the folding area 403c may be configured as a curved surface having a predetermined curvature.

In another example, when the electronic device 400 is in the intermediate state (e.g., a partially folded state), the first housing structure 402a and the second housing structure 402b may be disposed to form a certain angle relative to each other. The surface of the first area 403a and the surface of the second area 403b of the display 403 may form an angle larger than that in the folded state and smaller than that in the unfolded state. At least a portion of the folding area 403c may be configured as a curved surface having a predetermined curvature, and the curvature in this case may be smaller than that in the folded state.

Figure 4B:
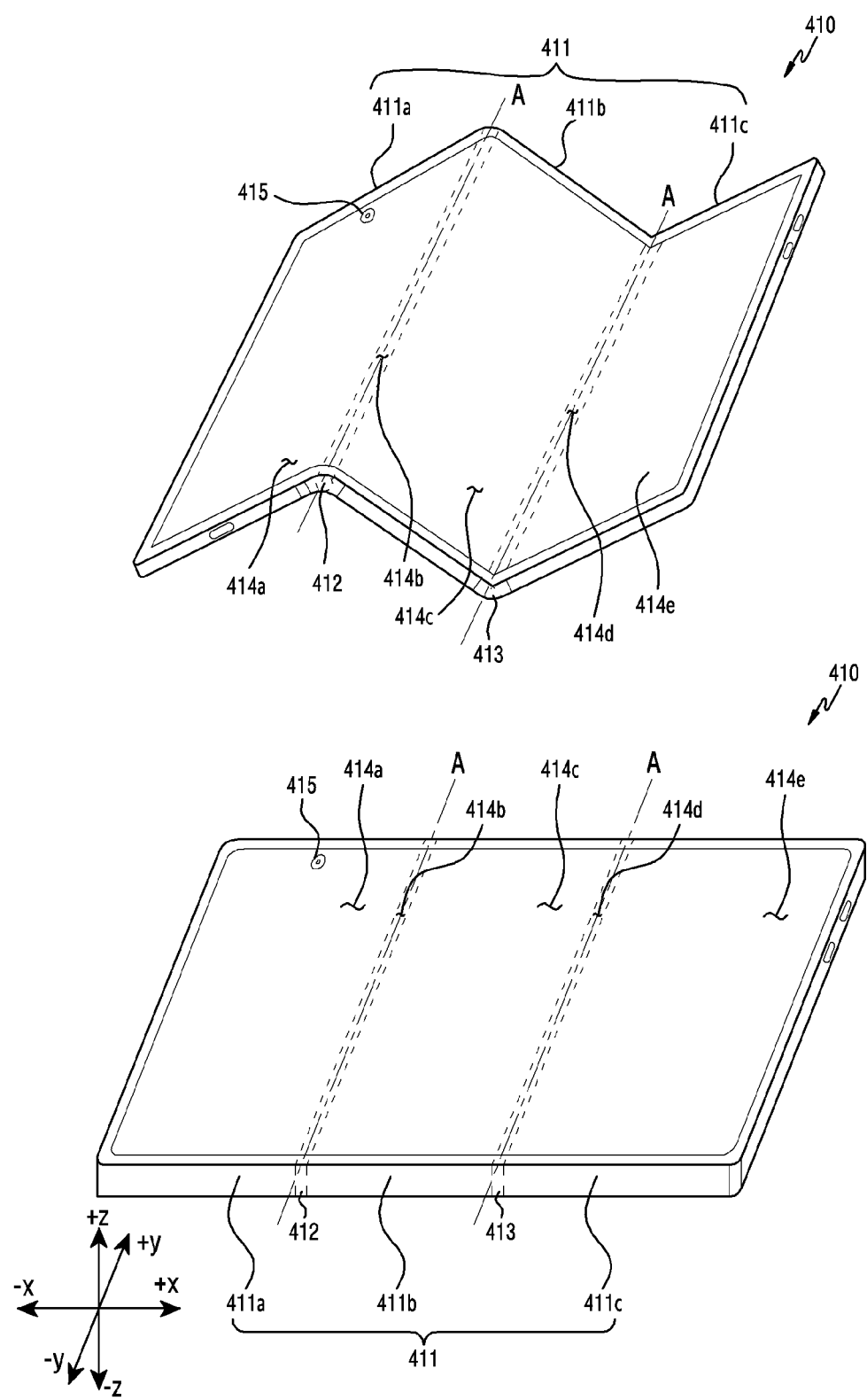
FIG. 4B is a diagram of an electronic device according to an embodiment.

FIG. 4B is a diagram of an electronic device 410 according to an embodiment.

Referring to FIG. 4B, an electronic device 410 according to an embodiment may include a foldable housing 411, a flexible display 414 (hereinafter, a "display" 414 for short), a first hinge assembly 412, a second hinge assembly 413, and/or a camera module 415.

In an embodiment, the foldable housing 411 may include a first housing structure 411a, a second housing structure 411b, and/or a third housing structure 411c. In an example, the first housing structure 411a, the second housing structure 411b, and the third housing structure 411c may each define a space in which electronic components (e.g., a printed circuit board, a battery, and a processor) of the electronic device 410 are disposed. In addition, the first housing structure 411a, the second housing structure 411b, and the third housing structure 411c described above may define the side surface of the electronic device 410. In the disclosure, a surface on which the display 414 is disposed is defined as the front surface of the electronic device 410, and a surface oriented in the opposite direction is defined as the rear surface of the electronic device 410. In addition, the surface surrounding the space between the front and rear surfaces of the electronic device 410 is defined as the side surface of the electronic device 410.

In an example, various types of components for performing various functions of the electronic device 410 may be disposed inside the first housing structure 411a, the second housing structure 411b, and the third housing structure 411c.

For example, a camera (e.g., the camera module 180 in FIG. 1), a receiver (e.g., the sound output device 155 in FIG. 1), a sensor (e.g., the sensor module 176 of FIG. 1 or an inertial sensor) and/or a processor (e.g., the processor 120 in FIG. 1) may be disposed inside the first housing structure 411*a*, the second housing structure 411*b*, and the third housing structure 411*c*, but the disclosure is limited thereto. The above-described electronic components may be exposed on the front surface of the electronic device 410 through at least one opening and/or recess provided in at least one area of the display 414.

According to an embodiment, the first housing structure 411*a* or the second housing structure 411*b* may rotate or swivel via the first hinge assembly 412 about a first folding axis (the axis B) to be folded or unfolded, and the second housing structure 411*b* or the third housing structure 411*c* may rotate or swivel via the second hinge assembly 413 about a second folding axis (the axis C) to be folded or unfolded.

In an example, when the electronic device 410 is in the unfolded (a flat state), the first housing structure 411*a*, the second housing structure 411*b*, and the third housing structure 411*c* may be arranged side by side with each other on the same surface. In another example, when the electronic device 410 is in the folded state, one surface of the first housing structure 411*a* and one surface of the second housing structure 411*b* may be disposed to face each other, and the other surface of the second housing structure 411*b* and one surface of the third housing structure 411*c* may be disposed to face each other. In another example, when the electronic device 410 is in the intermediate state rather than in the unfolded state or the folded state described above, the first housing structure 411*a* and the second housing structure 411*b* may be disposed to form a predetermined angle therebetween, and the second housing structure 411*b* and the third housing structure 411*c* may be disposed to form a predetermined angle therebetween.

According to an embodiment, the first housing structure 411*a*, the second housing structure 411*b*, and/or the third housing structure 411*c* may define a recess for receiving the display 414, and the display 414 may be seated in the recess and supported by the first housing structure 411*a*, the second housing structure 411*b*, and the third housing structure 411*c*. In an example, at least a portion of the first housing structure 411*a*, the second housing structure 411*b*, and/or the third housing structure 411*c* may be made of a metal material and/or a non-metal material having a predetermined rigidity to support the display 414.

According to an embodiment, the display 414 may refer to a display in which at least a partial area is deformable into a flat or a curved shape. According to an embodiment, the display 414 may define the front surface of the electronic device 410 when the electronic device 410 is in the unfolded state. In an example, the display 414 may be disposed to extend from one area of the first housing structure 411*a* to at least one area of the second housing structure 411*b* across the first hinge assembly 412, and may be disposed to extend from one area of the second housing structure 411*b* to at least one area of the third housing structure 411*c* across the second hinge assembly 413.

According to an embodiment, the display 414 may include a first folding area 414*b* and a first area 414*a* located on one side of the first folding area 414*b* (e.g., one side in the −x direction in FIG. 4B) and/or a second region 414*c* located on the other side of the first folding region 414*b* (e.g., one side in the +x direction in FIG. 4B). In addition, the display 414 may include a second folding area 414*d* disposed on one side of the second area 414*c* (e.g., one side in the +x-direction in FIG. 4B) and/or a third area 414*e* disposed on one side of the second folding area 414*d* (e.g., one side in the +x direction in FIG. 4B).

In an example, the first area 414*a* of the display 414 may correspond to at least one area of the first housing structure 411*a*. In another example, the second area 414*c* of the display 414 may correspond to at least one area of the second housing structure 411*b*, and the third area 414*e* of the display 414 may correspond to at least one area of the third housing structure 411*c*. In an example, the first folding area 414*b* is positioned between the first area 414*a* and the second area 414*c* and may be formed of a material having a flexible characteristic. The above-described first folding area 414*b* may be bent or folded along the first folding axis (the axis B) in the process of rotating the electronic device 410. In another example, the second folding area 414*d* is positioned between the second area 414*c* and the third area 414*e* and may be formed of a material having a flexible characteristic. The above-described second folding area 414*d* may be bendable or foldable along the second folding axis (the axis C) in the process of rotating the electronic device 410. However, the area of the display 414 is not limited to the above-described embodiment, and according to an embodiment, the first area 414*a*, the second area 414*c*, and/or the third area 414*e* of the display 414 may also be formed of a flexible characteristic similar to the first folding area 414*b* and/or the second folding area 414*d*.

According to an embodiment, when the electronic device 400 is in the unfolded state, the first area 414*a*, the second area 414*c*, the third area 414*e*, the first folding area 414*b* and/or the second folding area 414*d* of the display 414 may be arranged side by side while being oriented in the same direction. According to another embodiment, when the electronic device 400 is in the folded state, the first folding area 414*b* may be bent about the first folding axis (the axis B) such that the first area 414*a* and the second area 414*c* are oriented in the opposite directions in the state in which the rear surfaces thereof are in contact with each other. In addition, when the electronic device 400 is in the folded state, the second folding area 414*d* may be bent along the second folding axis (the axis C) such that the second area 414*c* and the third area 414*e* face each other. According to another embodiment, when the electronic device 400 is in the intermediate state, the first folding area 414*b* is bent along the first folding axis (the axis B) such that the first area 414*a* and the second area 414*c* are disposed to form a predetermined angle therebetween. In addition, when the electronic device 400 is in the intermediate state, the second folding area 414*d* may be bent along the second folding axis (the axis C) such that the second area 414*c* and the third area 414*e* form a predetermined angle therebetween.

According to an embodiment, the first hinge assembly 412 may connect the first housing structure 411*a* and the second housing structure 411*b* to each other, and the second hinge assembly 413 may connect the second housing structure 411*b* and the third housing structure 411*c* to each other. In an example, the first housing structure 411*a* may swivel or rotate within a specified rotation range with respect to the second housing structure 411*b* via the first hinge assembly 412. In another example, the second housing structure 411*b* may swivel or rotate within a predetermined rotation range with respect to the third housing structure 411*c* via the second hinge assembly 413.

In the disclosure, the first hinge assembly 412 and the second hinge assembly 413 have been described based on an example in which the first hinge assembly 412 and the second hinge assembly 413 rotate in opposite directions within a predetermined rotation range (e.g., 180 degrees), but the rotation ranges of the first hinge assembly 412 and the second hinge assembly 413 are not limited to the above-described embodiments. According to another embodiment, the first hinge assembly 412 and the second hinge assembly 413 may rotate in the same direction within a predetermined rotation range. For example, the first folding area 414b may be bent so that the first area 414a and the second area 414c of the display 414 may be disposed to face each other. In addition, the second folding area 414d may be bent such that the second area 414c and the third area 414e of the display 414 may be oriented in the opposite directions in the state in which the rear surfaces thereof are in contact with each other. According to another embodiment, the first hinge assembly 412 and the second hinge assembly 413 may be freely rotatable clockwise and/or counterclockwise within a 360 degree range without being limited in the rotation range.

According to an embodiment, the first hinge assembly 412 and/or the second hinge assembly 413 may include a hinge housing, and the above-described hinge housing may be coupled to the foldable housing 411. The hinge housing of the first hinge assembly 412 and/or the hinge housing of the second hinge assembly 413 may be exposed to the outside of the electronic device 410 or covered by the foldable housing 411 depending on the state of the electronic device 410.

As an example, the hinge housing of the first hinge assembly 412 and/or the hinge housing of the second hinge assembly 413 may be covered by the foldable housing 411 not be visible to the outside of the electronic device 410 when the electronic device 410 is in the unfolded state. As another example, the hinge housing of the first hinge assembly 412 and/or the hinge housing of the second hinge assembly 413 may be visible from the outside of the electronic device 410 when the electronic device 410 is in the folded state. As still another example, the hinge housing of the first hinge assembly 412 and/or the hinge housing of the second hinge assembly 413 may be visible from the outside between the first housing structure 411a and the second housing structure 411b and/or between the second housing structure 411b and the third housing structure 411c when the electronic device 410 is in the intermediate state. An area of the above-described hinge housing that is visible from the outside of the electronic device 410 when the electronic device 410 is in the intermediate state may be smaller than an area of the hinge housing that is visible when the electronic device 410 is in the folded state.

According to an embodiment, the camera module 415 may be disposed inside the electronic device 410 to be capable of capturing an external image, and may be disposed in an area corresponding to at least one area (e.g., the +y-direction area) of the display 414. For example, the camera module 415 may be disposed in an area corresponding to the first area 414a of the display 414, but is not limited thereto. In another example, the camera module 415 may be disposed in an area corresponding to the second area 414c of the display 414 or may be disposed in an area corresponding to the third area 414e of the display 414. In an example, an opening or a recess may be provided in at least one area of the display 414, and the above-described camera module 415 may be visible on the front surface of the electronic device 410 through the opening or the recess of the display 414.

Figure 4C:
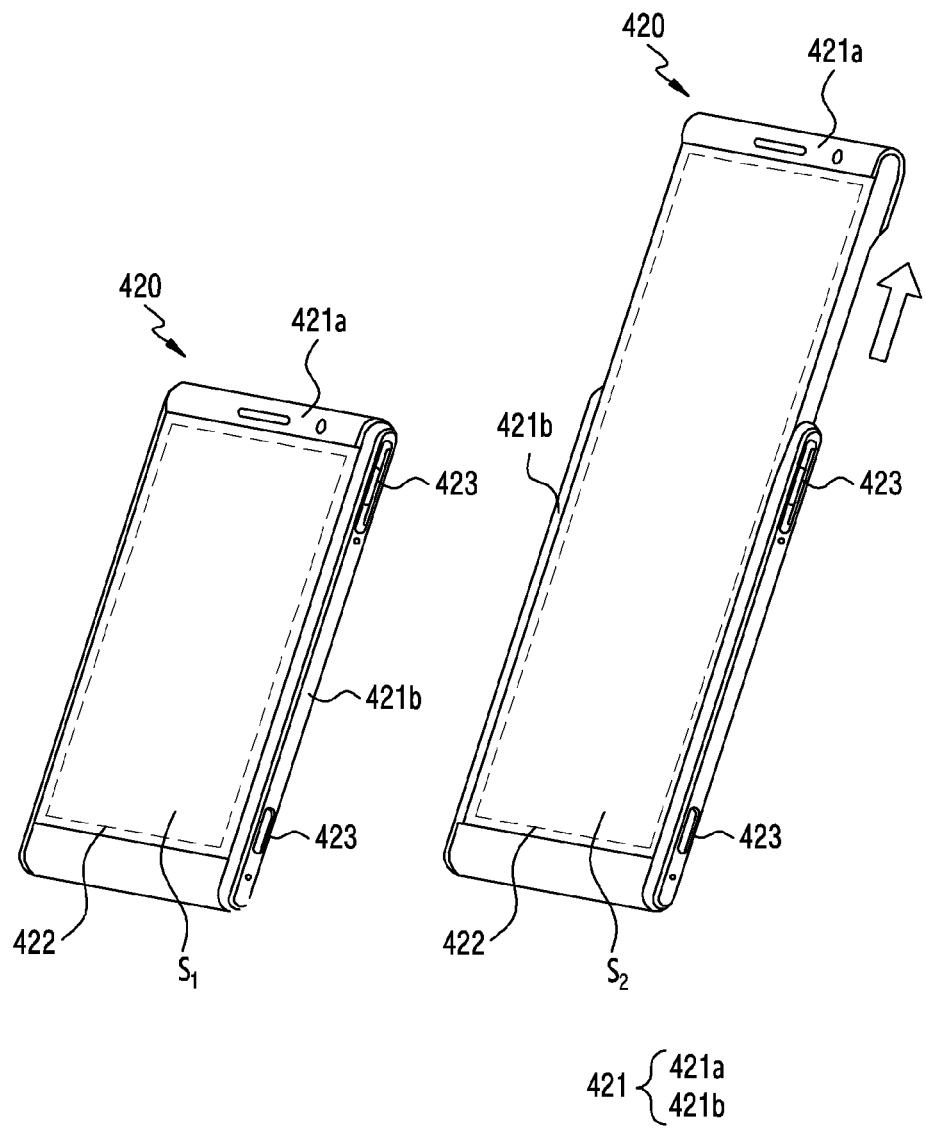
FIG. 4C is a diagram of an electronic device according to an embodiment.

FIG. 4C is a diagram of an electronic device 420 according to an embodiment.

Referring to FIG. 4C, the electronic device 420 according to yet another embodiment may include a housing 421, a rollable display 422 (hereinafter, a "display" for short), and/or key input devices 423.

According to an embodiment, the housing 421 may include a first housing 421a and/or a second housing 421b, and the first housing 421a and/or the second housing 421b may accommodate the display 422. In an example, the first housing 421a and the second housing 421b may be movably connected to each other. For example, the first housing 421a may be movable in a predetermined direction with respect to the second housing 421b. In an example, the first housing 421a and/or the second housing 421b may be movably coupled to each other via a multiple-bar linkage structure that is rotatably connected thereto. However, the connection structure of the first housing 421a and/or the second housing 421b is not limited to the above-described embodiment. In another example, the first housing 421a and/or the second housing 421b may be movably coupled to each other via a plurality of gears (e.g., a rack gear and a pinion gear). In an example, the first housing 421a may be spaced apart from the second housing 421b by a user's manipulation. For example, the first housing 421a may be moved upward relative to the second housing 421b by a user's manipulation to be spaced apart from the second housing 421b. In the disclosure, the state in which the first housing 421a is spaced apart from the second housing 421b (e.g., the state at the right side of FIG. 4C) may be defined as an "open state", and the state in which the first housing 421a and the second housing 421b are approached to each other (e.g., the state at the left side of FIG. 4C) is defined as a "closed state".

According to an embodiment, the key input devices 423 may be disposed on a side surface of the housing 421. In another embodiment, the electronic device 400 may not include some or all of the above-mentioned key input devices 423, and a key input device 423, which is not included, may be implemented in another form, such as a soft key, on the display 422.

According to an embodiment, the display 422 may have a flexible characteristic and may define the front surface of the electronic device 420. In an example, the first housing 421a may include a roller on which at least a portion of the display 422 may be wound. For example, when the electronic device 420 is in the closed state, at least a partial area of the display 422 may be accommodated in the first housing 421a and/or the second housing 421b while being wound around the roller of the first housing 421a. As another example, when the electronic device 420 is switched from the closed state, the first housing 421a may be spaced apart from the second housing 421b. As the first housing 421a is spaced apart from the second housing 421b, at least a partial area of the display 422 wound around the roller of the first housing 421a may be unwound, and as a result, the area of the display 422 visible from the outside of the electronic device 420 may be expanded. That is, an area of the display 422 that is visible from the outside of the electronic device 420 according to an embodiment may vary depending on the state (e.g., the closed state or the open state) of the electronic device 420. For example, the area $S_2$ of the display 422 visible from the outside of the electronic device 420 when the electronic device 420 is in the open state may be greater than the area $S_1$ of the display 422 visible from the outside of the electronic device 420 when the electronic device 420 is in the closed state.

Figure 5A:
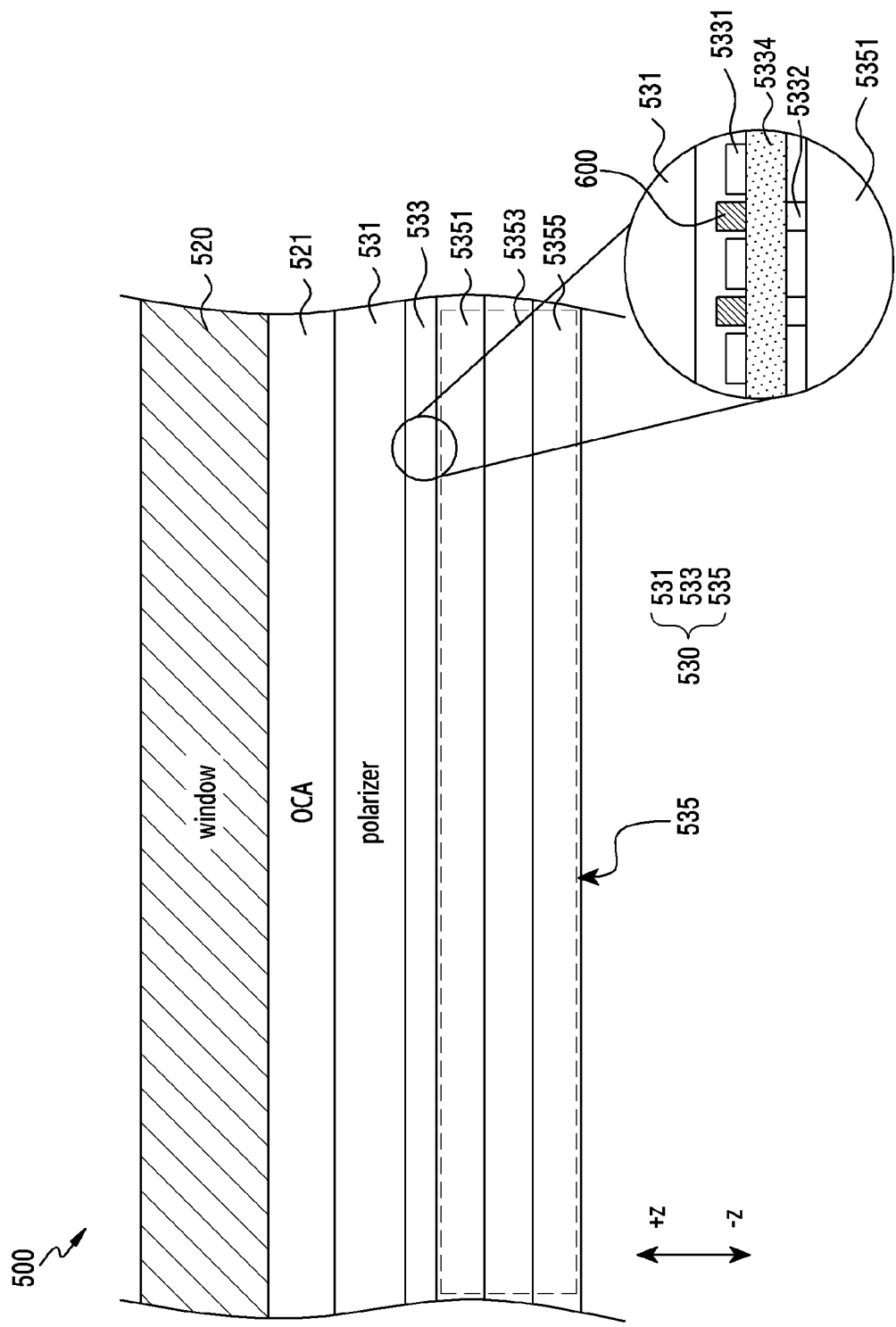
FIG. 5A is a diagram illustrating disposed positions of force sensors and a touch panel according to an embodiment.
Figure 5B:
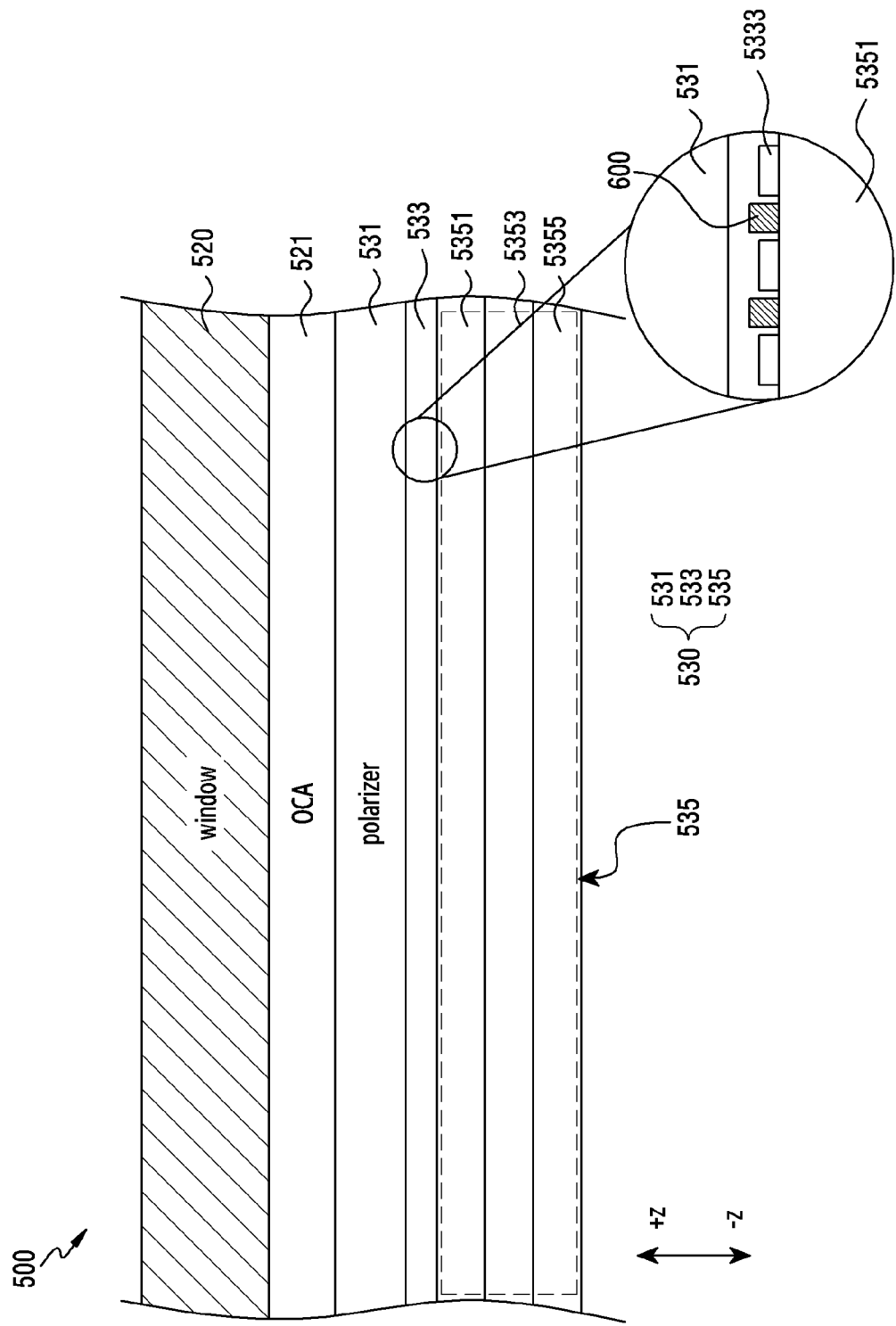
FIG. 5B is a diagram illustrating disposed positions of force sensors and a touch panel according to an embodiment.
Figure 5D:
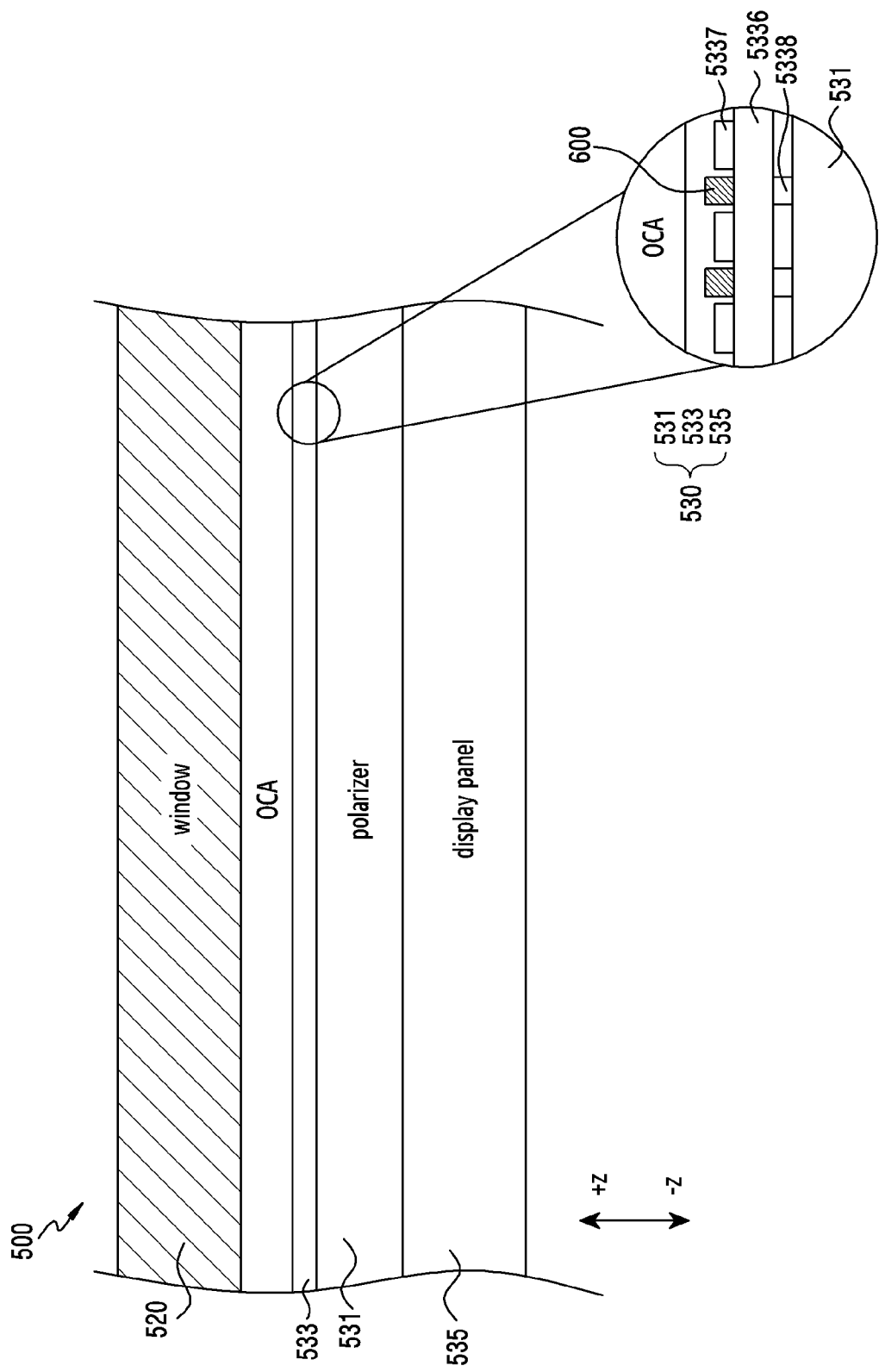
FIG. 5D is a diagram illustrating disposed positions of force sensors and a touch panel according to an embodiment.

FIG. 5A is a diagram illustrating disposed positions of force sensors 600 and a touch sensor 533 according to an embodiment. FIG. 5B is a diagram illustrating disposed positions of force sensors 600 and a touch sensor 533 according to an embodiment. FIG. 5C is a diagram illustrating disposed positions of force sensors 600 and a touch sensor 533 according to an embodiment. FIG. 5D is a diagram illustrating disposed positions of force sensors 600 and a touch sensor 533 according to an embodiment. The electronic devices 500 of FIGS. 5A, 5B, 5C, and/or 5D may be at least one of the electronic device 300 of FIGS. 3A, 3B, and/or 3C, the electronic device 400 of FIG. 4A, the electronic device 410 of FIG. 4B, or the electronic device 420 of FIG. 4C, but are not limited thereto.

Referring to FIGS. 5A, 5B, 5C and/or 5D, the electronic device 500 (e.g., the electronic device 400 in FIG. 4A, the electronic device 410 of FIG. 4B, or the electronic device 420 in FIG. 4C) according to various embodiments may include a cover window 520 (e.g., the front plate 420 in FIG. 4) and a display 530 (e.g., the display 430 in FIG. 4). At least one of the components of the electronic device 500 of FIGS. 5A to 5D may be the same as or similar to at least one of the components of the electronic device 400 of FIG. 4A, the electronic device 410 of FIG. 4B, and the electronic device 420 of FIG. 4C, and overlapping descriptions will be omitted below.

The display 530 according to an embodiment may be positioned under (e.g., in the −z direction of FIG. 5A) of the cover window 520, and may be visible from the outside of the electronic device 500 through the cover window 520. According to various embodiments, the display 530 may include a polarizer 531, a touch sensor 533, a display panel 535, and a plurality of force sensors 600. According to another embodiment, some components (e.g., the polarizer 531) of the display 530 may be omitted or another component (e.g., a color filter) may be added. In an example, the polarizer 531 is positioned between the cover window 520 and the display panel 535 and passes only the light in a specific direction among the light generated by the display panel 535 to control the amount of light. In another example, the polarizer 531 may prevent the display panel 535 from being visible from the outside of the electronic device 500 by adjusting the amount of light reflected by an internal component (e.g., a circuit) of the display panel after external light outside the electronic device 500 is incident on the display panel 535. For example, one polarizer may be disposed between the cover window 520 and the display panel 535, but two or more polarizers may be disposed between the cover window 520 and the display panel 535 according to an embodiment. In an example, the polarizer 531 may be attached to an area (e.g., an area in the −z direction of FIG. 5A) of the cover window 520 via an adhesive member 521 (e.g., an optical clear adhesive (OCA)), or may be attached to an area (e.g., an area in the −z direction of FIG. 5C) of the display panel 535, but is not limited thereto.

The polarizer 531 may be omitted from the display panel 535 of the electronic device 500 according to an embodiment. In an example, the display 530 of the electronic device 500 may further include a color filter in place of the polarizer 531. The above-described color filter may include a polarization layer that polarizes light generated from the display panel 535 to be capable of preventing the display panel 535 from being visible from the outside of the electronic device 500 by adjusting the amount of light generated from the display panel 535 or by adjusting the amount light reflected by the display panel 535.

In an example, the touch sensor 533 may detect a user's touch input that is input through the cover window 520 and generate a detection signal. The detection signal generated by the touch sensor 533 may be transmitted or transferred to a touch sensor IC electrically connected to the touch sensor 533, and the touch sensor IC may data-process (or "process") the detection signal received from the touch sensor 533 and may then transmit the processed detection signal data to the processor (e.g., the processor 120 in FIG. 1). In an example, the detection signal generated by the touch sensor 533 may include data of coordinates to which a user has inputted a touch. In an example, the touch sensor 533 may be a capacitive overlay touch panel in which a conductive pattern (e.g., 533a in FIG. 5B) is provided in at least one area of a transparent film or glass to allow a predetermined amount of current to flow and which detects a change in capacitance generated when a touch input is input. However, the method in which the touch sensor 533 detects the user's touch input is not limited to the above-described embodiment, and according to an embodiment, the touch sensor 533 may detect a user's touch input by using a resistive overlay method or an infrared beam method.

In an example, the display panel 535 may provide various kinds of visual information such as texts, images, and/or icons to the user. The display panel 535 may be constituted with at least one of, for example, a liquid crystal display (LCD), organic light-emitting diodes (OLEDs), active matrix organic LEDs (AMOLEDs), or micro LEDs.

In an example the plurality of force sensors 600 may detect a pressure applied to the cover window 520 and generate a detection signal corresponding to the pressure detected in the cover window 520. For example, the detection signal generated by the plurality of force sensors 600 may be transmitted or transferred to a force sensor IC electrically connected to the plurality of force sensors 600, and the force sensor IC may data-process the detection signal generated by the plurality of force sensors 600 and may then transmit the processed detection signal data to a processor. As another example, the detection signal generated by the plurality of force sensors 600 may be transmitted or transferred to an integrated IC which is electrically connected to the plurality of force sensors 600 and in which the touch sensor IC and the force sensor IC are integrated, and the integrated IC may data-process the detection signal generated by the plurality of force sensors 600 and may then transmit the processed detection signal data to a processor. In an example, the plurality of force sensors 600 include a material (e.g., metal or semiconductor) that is deformable by a pressure, and may be strain gauge sensors that measure a pressure by detecting a change in resistance that occurs when the above-described material is deformed. For example, the plurality of force sensors 600 may include a wire-type, thin-film-type, and/or film-type strain gauge sensors, but are not limited thereto.

In an example, the plurality of force sensors 600 may detect a change in resistance via a Wheatstone bridge. For example, when a pressure is applied to the force sensors 600, a resistance value may increase, and the plurality of force sensors 600 may detect an increase in resistance via a Wheatstone bridge.

In an example, the plurality of force sensors 600 may be disposed on the same layer as the touch sensor 533, and the touch sensor 533 and/or the plurality of force sensors 600 may be disposed between the cover window 520 and the display panel 535 according to an embodiment. Hereinafter, positions at which the touch sensor 533 and the plurality of force sensors 600 are arranged in the electronic device 500 according to various embodiments will be described with reference to FIGS. 5A to 5D.

Referring to FIGS. 5A and 5B, the touch sensor 533 according to an embodiment may be embedded in the display panel 535, and the plurality of force sensors 600 may be disposed on the same layer as the touch sensor 533 embedded in the display panel 535.

In an example, the display panel 535 may be an on-cell touch screen panel (TSP) AMOLED (OCTA) display panel (e.g., see FIG. 5A) or a Y-OCTA display panel (e.g., see FIG. 5B). The above-described display panel 535 may include, for example, an encapsulation layer 5351, an organic light-emitting layer 5353, and a backplane substrate 5355. The encapsulation layer 5351 may be disposed on the organic emission layer 5353 (e.g., in the +z direction of FIGS. 5A and 5B) to prevent the organic emission layer 5353 from coming into contact with oxygen or moisture. The organic light-emitting layer 5353 is made of an organic material, and may generate light when an electric current is applied thereto. The backplane substrate 5355 may be positioned under the organic light-emitting layer 5353 (e.g., the −z direction in FIGS. 5A and 5B), and an electronic component (e.g., a thin film transistor (TFT) element and/or a metal wire) for driving the organic light-emitting layer 5353) may be disposed on the backplane substrate.

In an example, the touch sensor 533 may be disposed on the encapsulation layer 5351 (e.g., in the +z direction of FIGS. 5A and 5B) of the display panel 535. Referring to FIG. 5A, the touch sensor 533 according to an embodiment may include a first electrode layer 5331 (or a "driving electrode layer"), a second electrode layer 5332 (or a "sensing electrode layer"), and/or an insulating layer 5334 disposed between the first electrode layer 5331 and the second electrode layer 5332 to insulate the first electrode layer 5331 and the second electrode layer 5332. For example, the first electrode layer 5331 and/or the second electrode layer 5332 may be formed in a manner of patterning a conductive material (e.g., aluminum (Al), copper (Cu), silver (Ag), graphene, an indium-tin-oxide (ITO), and/or an indium-zinc-oxide (IZO)) on the encapsulation layer 5351 of the display panel 535, but are not limited thereto. In an example, the touch sensor 533 may be electrically connected to a touch sensor IC. The above-mentioned touch sensor IC may apply a voltage to the first electrode layer 5331 and/or the second electrode layer 5332, and accordingly, a current may flow in the first electrode layer 5331 and/or the second electrode layer 5332. In another example, the touch sensor IC may detect a change in capacitance between the first electrode layer 5331 and the second electrode layer 5332 generated by a user's touch input to the cover window 520, and may detect whether or not there is a user's touch based on the detected change in capacitance.

Referring to FIG. 5B, a touch sensor 533 according to another embodiment may be electrically connected to the touch sensor IC and may include a third electrode layer 5333. That is, the touch sensor 533 of FIG. 5B may include a single electrode layer (e.g., a third electrode layer 5333) unlike the touch sensor of FIG. 5A that includes two electrode layers (e.g., a first electrode layer 5331 and a second electrode layer 5332). In an example, the touch sensor 533 may be electrically connected to a touch sensor IC. The above-mentioned touch sensor IC may apply a voltage to the third electrode layer 5333, and accordingly, a current may flow in the third electrode layer 5333. In another example, the touch sensor IC may detect a change in capacitance of the third electrode layer 5333 generated by a user's touch input to the cover window 520, and may detect whether or not a user's touch input is input based on the detected change in capacitance.

According to an embodiment, the plurality of force sensors 600 may be disposed on the encapsulation layer 5351 of the display panel 535 in the same way as or similarly to those disposed on the touch sensor 533. In an example, the plurality of force sensors 600 may be disposed in empty spaces or dummy areas formed in an electrode layer of the touch sensor 533, and may be disposed on the same layer as the touch sensor 533. For example (e.g., see FIG. 5A), the plurality of force sensors 600 may be disposed in empty spaces or dummy areas provided between signal wires of the first electrode layer 5331. As another example (e.g., see FIG. 5B), the plurality of force sensors 600 may be disposed in empty spaces or dummy areas provided between signal wires of the third electrode layer 5332. Accordingly, in the electronic device 500 according to an embodiment, the polarizer 531, the plurality of force sensors 600, the touch sensor 533, and the display panel 535 may be disposed in this order downward from the cover window 520.

Referring to FIGS. 5C and 5D, a touch sensor 533 according to another embodiment may be disposed on the bottom surface (e.g., the surface in the −z direction of FIGS. 5C and 5D) of the cover window 520. In an example, the touch sensor 533 may be attached to at least one area of the bottom surface of the cover window 520 via an adhesive member 521 (e.g., an OCA). In another example, the touch sensor 533 may be disposed on the bottom surface of the cover window 520 without a separate adhesive member.

In an example, the touch sensor 533 may include a substrate 5336, a fourth electrode layer 5337 (or a "driving electrode layer") and/or a fifth electrode layer 5338 (or a "sensing electrode layer"). For example, the substrate 5336 of the touch sensor 533 may be at least one of a glass substrate, a polymer substrate (e.g., a substrate made of polyimide (PI) material), or a film. As another example, the fourth electrode layer 5337 and/or the fifth electrode layer 5338 of the touch sensor 533 may be disposed on the above-mentioned substrate 5336 by patterning a conductive material (e.g., an indium-tin-oxide (ITO) or an indium-zinc-oxide (IZO)). In an example, the fourth electrode layer 5337 may be disposed on the substrate 5336 (e.g., in the +z direction of FIGS. 5C and 5D), and the fifth electrode layer 5338 may be disposed under the substrate 5336 (e.g., the −z direction in FIGS. 5C and 5D). In another example, the fourth electrode layer 5337 may be disposed under the substrate 5336, and the fifth electrode layer 5338 may be disposed on the substrate 5336.

In an example, the plurality of force sensors 600 may be disposed on the substrate 5336 of the touch sensor 533. For example, the plurality of force sensors 600 may be disposed in empty spaces or dummy areas formed between signal wires of the fourth electrode layer 5337 disposed on the substrate 5336. Accordingly, the touch sensor 533 and the plurality of force sensors 600 may be disposed on the same layer. In the electronic device 500 according to another embodiment, the plurality of force sensors 600, the touch sensor 533, the polarizer 531, and the display panel 535 may be disposed in this order.

According to various embodiments, the touch sensor 533 of the electronic device 500 may be fabricated through a manner of being patterned in at least one area of the display panel 535 (or an "on-cell" method) or a manner of being attached to some components of the electronic device 500 (e.g., the display panel 535 or the cover window 520) (or an "add-on" manner). However, the manner of fabricating the touch sensor 533 of the electronic device 500 is not limited to the above-described embodiment, and according to another embodiment, the touch sensor 533 may be fabricated through a manner of being embedded in the display panel 535 (or an "in-cell" manner).

Figure 6:
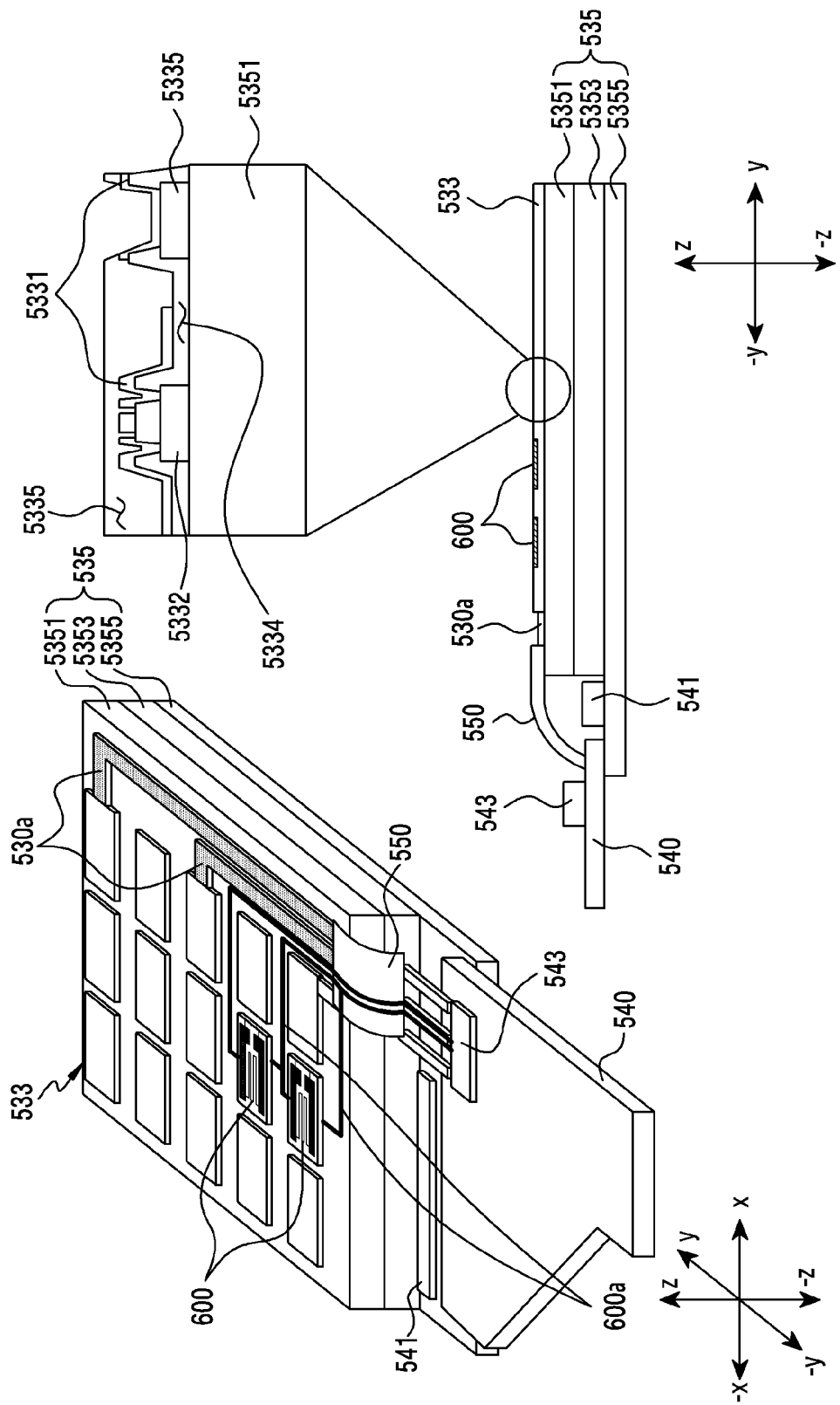
FIG. 6 is a diagram illustrating a touch sensor and force sensors disposed on the same layer according to an embodiment.

FIG. 6 is a diagram illustrating a touch sensor 533 and force sensors 600 disposed on the same layer according to an embodiment. FIG. 6 illustrates only some of electronic components disposed inside the electronic device 400 of FIG. 4 and/or the electronic device 500 of FIGS. 5A to 5D.

Referring to FIG. 6, an electronic device (e.g., the electronic device 400 in FIG. 4 and the electronic device 500 in FIGS. 5A to 5D) according to an embodiment may include a touch sensor 533 (e.g., the touch sensor 533 in FIG. 5A), a display panel 535 (e.g., the display panel 535 in FIG. 5A), a printed circuit board 540 (e.g., the printed circuit board 440 in FIG. 4), a display driver IC 541 (e.g., the DDI 230 in FIG. 2), an integrated IC 543, and a plurality of force sensors 600. At least one of the components of the electronic device according to an embodiment may be the same as or similar to at least one of the components of the electronic device 500 of FIGS. 5A to 5D, and overlapping descriptions thereof will be omitted below.

According to an embodiment (e.g., see FIG. 5A), the touch sensor 533 may include a first electrode layer 5331 (e.g., the first electrode layer 5331 in FIG. 5A), a second electrode layer 5332 (e.g., the second electrode layer 5332 in FIG. 5A), a first insulating layer 5334 (e.g., the insulating layer 5334 in FIG. 5A), and/or a second insulating layer 5335. In an example, the first electrode layer 5331 (or a "driving electrode layer") and/or the second electrode layer 5332 (or a "sensing electrode layer") may be disposed on at least one surface of the display panel 535 (e.g., in the +z-direction of FIG. 6D). For example, the display panel 535 may have a structure in which an organic light-emitting layer 5353 (e.g., the organic light-emitting layer 5353 in FIG. 5A) and an encapsulation layer 5351 (e.g., the encapsulation layer 5351 in FIG. 5A) are laminated in this order on the backplane substrate 5355 (e.g., the backplane substrate 5355 in FIG. 5A) (e.g., the z direction of FIG. 6). As another example, the first electrode layer 5331 and/or the second electrode layer 5332 may be disposed in at least one area of the encapsulation layer 5351 of the display panel 535. In an example, the first electrode layer 5331 may be positioned on the second electrode layer 5332. The disposition structure of the first electrode layer 5331 and/or the second electrode layer 5332 is not limited to the above-described embodiment, and in another example, the second electrode layer 5332 may be disposed on the first electrode layer 5331. In another example, the first insulating layer 5337 may be disposed between the first electrode layer 5331 and the second electrode layer 5332, and the second insulating layer 5335 is on the first electrode layer 5331 (e.g., FIG. 6 in the z direction). The first insulating layer 5337 and/or the second insulating layer 5335 described above may protect the first electrode layer 5331 and the second electrode layer 5532, and may insulate the first electrode layer 5331 and the second electrode layer 5532. In an example, the first electrode layer 5331 and/or the second electrode layer 5332 may be electrically connected to the integrated IC 543, and the integrated IC 543 may apply a voltage to the first electrode layer 5331 and/or the second electrode layer 5332. When a user's touch is input to the cover glass (e.g., the cover window 520 in FIG. 5A) disposed on the touch sensor 533 (e.g., the +z direction of FIG. 6), the capacitance between the first electrode layer 5331 and the second electrode layers 5332 may be changed.

According to another embodiment (e.g., see FIG. 5B), the touch sensor 533 may include one electrode layer (e.g., the third electrode layer 5333 in FIG. 5B) and/or an insulating layer that insulates the above-described electrode layer. In an example, the above-described electrode layer may be electrically connected to the integrated IC 543, and a voltage may be applied to the above-described electrode layer. When a user's touch on the cover glass (e.g., the cover window 520 in FIG. 5A) disposed on the touch sensor 533 (e.g., the z direction in FIG. 6) is input, the capacitance of the above-described electrode layer may be changed, and the integrated IC 543 may determine whether the user's touch input is input by detecting a change in capacitance of the electrode layer.

According to an embodiment, the plurality of force sensors 600 may detect a pressure corresponding to a user's touch input that is input via the cover window (e.g., the cover window 520 in FIGS. 5A, 5B, 5C, and 5D). In an example, the plurality of force sensors 600 may include a material deformable by a pressure (e.g., a metal or a semiconductor), and when the material is deformed, the resistance value of the material may change. The plurality of force sensors 600 may detect a change in resistance of the material by using a Wheatstone bridge, and may detect a pressure corresponding to a user's touch input based on the detected change in resistance.

In an example, the plurality of force sensors 600 may be disposed on the same layer as the touch sensor 533. For example, the plurality of force sensors 600 may be provided in empty spaces or dummy areas formed between signal wires of the first electrode layer 5331 of the touch sensor 533. For example, the plurality of force sensors 600 may be provided in empty spaces or dummy areas formed between signal wires of the second electrode layer 5332 of the touch sensor 533. However, the disposition structure of the plurality of force sensors 600 is not limited to the above-described embodiment, and according to an embodiment, the force sensors 600 may be disposed on a layer (e.g., the layer under the touch sensor 533) different from the touch sensor 533. According to an embodiment, the display driver IC 541 (e.g., the DDI 230 in FIG. 2) may be disposed in at least one area of the display panel 535. For example, the display driver IC 541 may be disposed in at least one area of the backplane substrate 5355 extending from the encapsulation layer 5351 and the organic light-emitting layer 5353. The above-described disposition structure of the display driver IC 541 may be referred to as a chip-on-plastic (COP) structure. In an example, the display driver IC 541 may be electrically connected to the display panel 535 and control driving of the display panel 535. According to another embodiment, the display driver IC 541 may be disposed on a film layer disposed in at least one area of the backplane substrate 5355 extending from the encapsulation layer 5351 and the organic light-emitting layer 5353. The above-described disposition structure of the display driver IC 541 may be referred to as a chip-on-film (COF) structure.

According to an embodiment, the integrated IC 543 may be disposed on the printed circuit board 540, and may be electrically or operatively connected to the touch sensor 533 and/or the plurality of force sensors 600.

In an example, the printed circuit board 540 may be electrically connected to the touch sensor 533 disposed on the display panel 535 via an electrical connection member 550 (e.g., a flexible printed circuit board (FPCB)). For example, the first electrode layer 5331 and/or the second electrode layer 5332 of the touch sensor 533 may be electrically connected to the electrical connection member 550 via a plurality of first signal wires 530*a*. In another example, the electrical connection member 550 may be electrically connected not only to the first electrode layer 5331 and/or the second electrode layer 5332 of the touch sensor 533, but also to the integrated IC 543. As a result, an electrical path may be formed between the integrated IC 543 and the first electrode layer 5331 and/or the second electrode layer 5332 of the touch sensor 533. That is, the first electrode layer 5331 and/or the second electrode layer 5332 may be electrically connected to the integrated IC 543 via the electrical connection member 550.

In another example, the integrated IC 543 disposed on the printed circuit board 540 may be electrically connected to the plurality of force sensors 600 via the electrical connection member 550. For example, the plurality of force sensors 600 may be electrically connected to the electrical connection member 550 via a plurality of second signal wires 600a, and the electrical connection member 550 may be electrically connected to the integrated IC 543 so that an electrical path may be formed between the integrated IC 543 and the plurality of force sensors 600. That is, the plurality of force sensors 600 may be electrically connected to the integrated IC 543 via the electrical connection member 550.

In an example, the integrated IC 543 may apply a voltage to the touch sensor 533 and/or the plurality of force sensors 600 to control the driving of the touch sensor 533 and/or the plurality of force sensors 600 or to sense a user's touch input and/or a pressure corresponding to the touch input. The integrated IC 543 may detect a position at which a user's touch input is input via, for example, the touch sensor 533 or may detect a pressure applied to the cover window by the user's touch input via the force sensors 600. In another example, the integrated IC 543 may data-process signals detected by the touch sensor 533 and/or the plurality of force sensors 600, and the data processed by the integrated IC 543 may be transmitted to a processor (e.g., the processor 120 in FIG. 1).

Figure 7A:
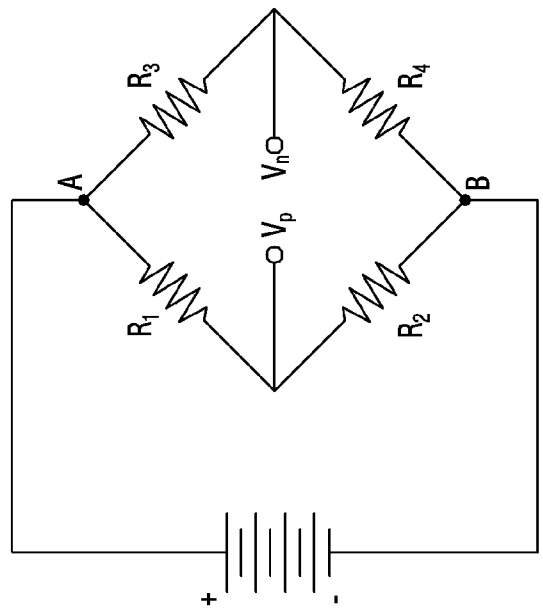
FIG. 7A is a diagram illustrating a partial area of a touch panel and force sensors disposed inside an electronic device according to an embodiment.
Figure 7A:
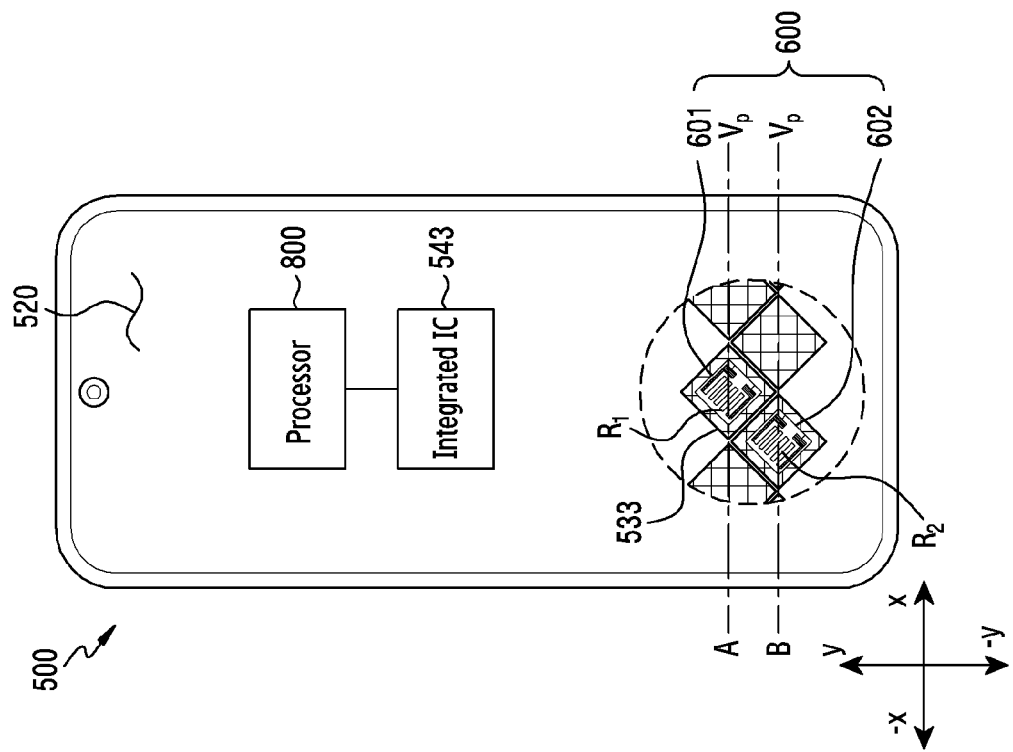
Figure 7B:
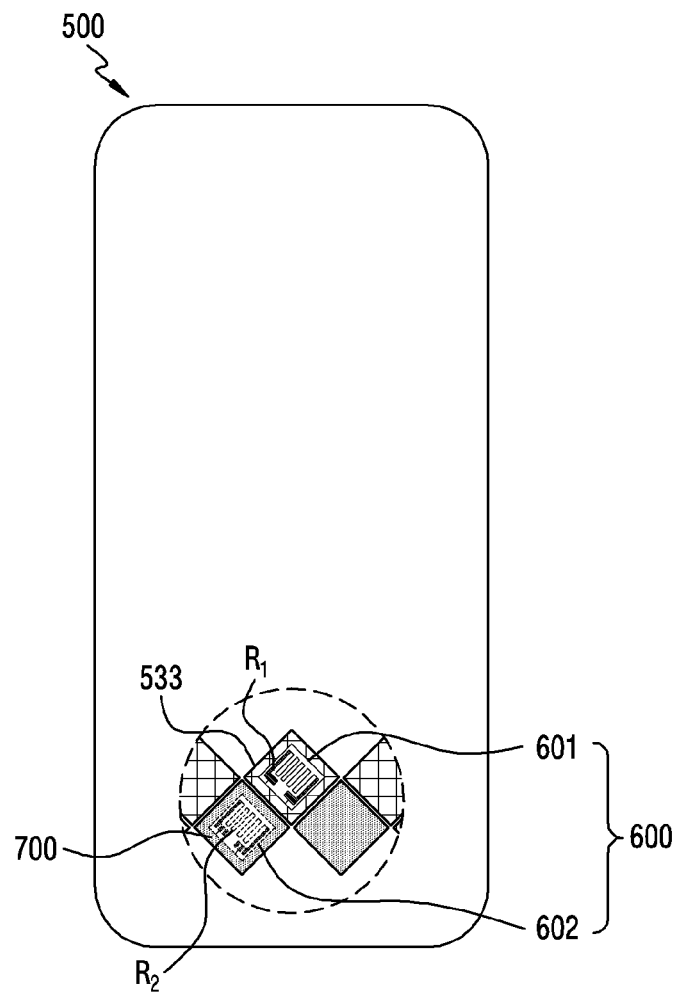
FIG. 7B is a diagram illustrating the rear surfaces of the force sensors of FIG. 7A according to an embodiment.

FIG. 7A is a diagram illustrating a partial area of a touch sensor 533 and force sensors 600 disposed inside an electronic device according to an embodiment. FIG. 7B is a diagram illustrating the rear surfaces of the force sensors 600 of FIG. 7A according to an embodiment. The dotted line area in FIG. 7A is an area viewed through the touch sensor 533 and the force sensors 600 disposed in the internal space of the electronic device.

Referring to FIGS. 7A and 7B, an electronic device 500 (e.g., the electronic device 500 in FIGS. 5A, 5B, 5C, and 5D) according to an embodiment may include a cover window 520 (e.g., the cover window 520 in FIGS. 5A, 5B, 5C, and 5D), a touch sensor 533 (e.g., the touch sensor 533 in FIG. 6), an integrated IC 543 (e.g., the integrated IC 543 in FIG. 6), a plurality of force sensors 600 (e.g., the plurality of force sensors 600 in FIG. 6), an adhesive member 700, and a processor 800 (e.g., the processor 120 in FIG. 1). At least one of the components of the electronic device 500 according to an embodiment may be the same as or similar to at least one of the components of the electronic device 500 of FIGS. 5A, 5B, 5C, and 5D and/or the electronic device of FIG. 6, and overlapping descriptions thereof will be omitted below.

According to an embodiment, the plurality of force sensors 600 may be disposed on the same layer as the touch sensor 533. In an example, the plurality of force sensors 600 may include a first force sensor 601 and a second force sensor 602. The first force sensor 601 may be disposed on the same layer as the second force sensor 602, and the first force sensor 601 and the second force sensor 602 may be disposed not to overlap each other. In FIG. 7A and/or FIG. 7B, the plurality of force sensors 600 are illustrated as being disposed in the central area of the electronic device 500, but the area in which the plurality of force sensors 600 are disposed is not limited to the illustrated embodiment. According to another embodiment, the plurality of force sensors 600 may be disposed at a left edge (e.g., the edge in the −x direction of FIG. 7A) or a right edge (e.g., the edge in the +x direction of FIG. 7A) of the electronic device 500. In addition, although the figures illustrate an embodiment in which the first force sensor 601 and the second sensor 602 have the same shape and each of the first and second force sensor is constituted with one sensor, but the shape and/or number of first force sensors 601 and/or second force sensors 602 may not be limited to the illustrated embodiment. According to another embodiment, the first force sensor 601 and the second force sensor 602 may be configured in different shapes, and the number of first force sensors 601 and the number of second force sensors 602 may be different from each other. For example, the first force sensor 601 may form one resistance value $R_1$ with one sensor, and the second force sensor 602 may form one resistance value $R_2$ with a plurality of (e.g., two, three, or three or more) sensors.

According to an embodiment, the integrated IC 543 may be electrically connected to the first force sensor 601 and/or the second force sensor 602, and the integrated IC 543 may apply a voltage to the first force sensor 601 and/or the second force sensor 602. In an example, the integrated IC 543 may include a plurality of resistance values (e.g., $R_3$ and $R_4$ in FIG. 7A), and a change in the resistance value $R_1$ of the first force sensor 601 and/or a change in the resistance value $R_2$ of the second force sensor 602 due to a pressure may be detected by using a Wheatstone bridge (e.g., a half bridge). Based on the detected change in the resistance value $R_1$ of the first force sensor 601 and/or the detected change in the resistance value $R_2$ of the second force sensor 602, the integrated IC 543 may detect the pressure applied to the first force sensor 601 and/or the pressure applied to the second force sensor 602. For example, when the resistance value $R_1$ of the first force sensor 601 and/or the resistance value $R_2$ of the second force sensor 602 change, a potential difference may be formed between a first terminal (e.g., $V_p$ in FIG. 7A) branched from the first force sensor 601 and/or the second force sensor 602 and a second terminal (e.g., $V_n$ in FIG. 7A) branched from resistances $R_3$ and $R_4$ included in the integrated IC 543. The integrated IC 543 may detect the potential difference between the first terminal $V_p$ and the second terminal $V_n$ according to a change in the resistance value $R_1$ of the first force sensor 601 and/or a change in the resistance value $R_2$ of the second force sensor 602, and may detect a pressure applied to the first force sensor 601 and/or the second force sensor 602 based on the detected potential difference. Point A in FIG. 7A may indicate a point at which the voltage applied to the integrated IC 543 is branched to the first force sensor 601 and/or at least one (e.g., $R_3$) disposed in the integrated IC 543, and point B may indicate at which the voltage applied to the integrated IC 153 is branched to the second force sensor 602 and/or at least one resistance (e.g., $R_4$) disposed in the integrated IC 543. In another example, the integrated IC 543 may be electrically connected to the touch sensor 533 to detect a change in capacitance of the electrode layers (e.g., the first electrode layer 5331 and the second electrode layer 5332 in FIG. 5A) of the touch sensor 533 according to a user's touch input. In another example, the integrated IC 543 may detect whether or not a user's touch input is input and/or a position (e.g., x, y coordinates) at which the user's touch input is input, based on the detected change in capacitance.

According to an embodiment, the adhesive member 700 may be attached only to at least one area of the rear surfaces (e.g., the −z direction surfaces of FIG. 6) of the plurality of force sensors 600. Referring to FIG. 7B, the adhesive member 700 may be attached only to the rear surface of the second force sensor 602 without being attached to the rear surface of the first force sensor 601. The adhesive member 700 may be, for example, a double-sided tape, an optical clear adhesive (OCA), or a polymer adhesive, but is not limited thereto. In an example, after the adhesive member 700 is attached to the rear surfaces of the plurality of force sensors 600, the adhesive members 700 may be attached only to the rear surface of the second force sensor 602 by removing the adhesive member 700 attached to an area other than the rear area of the second force sensor 602 (e.g., the rear area of the first force sensor 601).

In an example, by attaching the adhesive member 700 to the rear surface of the second force sensor 602, the space in which the second force sensor 602 is deformable or bendable may be reduced. In another example, an air layer is formed on the rear surface of the first force sensor 601 without a separate adhesive member 700, so that the first force sensor 601 is freely deformable or bendable by a pressure. Accordingly, when a pressure is applied to the first force sensor 601 and/or the second force sensor 602, the change in the resistance value $R_2$ of the second force sensor 602 may be small compared to the change in the resistance value $R_1$ of the first force sensor 601 to which the adhesive member 700 is not attached. The processor 800 according to an embodiment may reduce a pressure detection error occurring due to the change in the resistance value of the first force sensor 601 and/or the resistance value of the second force sensor 602 due to a temperature change by using a difference between the resistance value $R_1$ of the first force sensor and the change in the resistance value $R_2$ of the second force sensor 602 described above. This will be described later.

According to an embodiment, the processor 800 may be electrically or operatively connected to the integrated IC 543 electrically connected to the touch sensor 533 and/or the plurality of force sensors 600. In an example, the processor 800 may receive, from the integrated IC 543, information as to whether or not a user's touch input is input and/or data of a position at which the user's touch input is input, detected by the integrated IC 543. In another example, the processor 800 may receive, from the integrated IC 543, pressure change amount data of the plurality of force sensors 600 detected by the integrated IC 543. For example, the processor 800 may receive the pressure change amount data of the first force sensor 601 and/or the pressure change amount data of the second force sensor 602 from the integrated IC 543. In an example, the processor 800 may detect a pressure applied to the cover window 520 based on the pressure change amount of the first force sensor 601 and/or the pressure change amount of the second force sensor 602 received from the integrated IC 543.

The resistance value $R_1$ of the first force sensor 601 and the resistance value $R_2$ of the second force sensor 602 may be changed not only with a pressure, but also with a temperature. For example, when the temperature around the electronic device 500 increases or a user's touch input is input, the resistance value $R_1$ of the first force sensor 601 and the resistance value $R_2$ of the second force sensor 602 may be changed. When a change in temperature (e.g., a user's touch input, a change in ambient temperature, or the like) occurs, the resistance value $R_1$ of the first force sensor 601 and the resistance value $R_2$ of the second force sensor 602 may be changed together. In contrast, when a pressure is applied to the cover window 520, the resistance value $R_1$ of the first force sensor 601 is changed, but the resistance value $R_2$ of the second force sensor 602, which has an adhesive member 700 attached to the rear surface thereof, may be hardly changed. Accordingly, in the electronic device 500 according to an embodiment, the second force sensor 602, which has the adhesive member 700 attached to the rear surface thereof, may be used as a force sensor for detecting a pressure change due to a temperature, and the first force sensor 601, which does not have the adhesive member 700 attached to the rear surface, may be used as a force sensor for detecting a pressure change due to a touch input.

In an example, the processor 800 may increase the difference between the pressure change amounts of the first force sensor 601 and the second force sensor 602 or reduce the effect of a temperature by processing (e.g., addition, subtraction, multiplication, or division) the pressure change amount of the first force sensor 601 and/or the pressure change amount of the second force sensor 602. As a result, the electronic device 500 according to an embodiment may detect a pressure applied to the cover window 520 more precisely.

In another example, since the temperature changes of the plurality of force sensors 600 may be different depending on the distances between the position at which a touch input is input and the plurality of force sensors 600, the processor 800 may detect the pressure applied to the cover window 520 in consideration of the distances between the position at which the touch input is input and the plurality of force sensors 600. In another example, since the temperature changes of the plurality of force sensors 600 may be different depending on the distances between a heat source and the plurality of force sensors 600, the processor 800 may detect the pressure applied to the cover window 520 in consideration of the distances between the heat source and the plurality of force sensors 600. This will be described in detail later.

With the electronic device 500 according to an embodiment, it is possible to suppress performance deterioration of force sensors 600 due to a temperature change by attaching an adhesive member 700 on the rear surfaces of some of the plurality of force sensors while reducing the overall thickness of at least the force sensors 600 by disposing the plurality of force sensors 600 on the same layer as described above.

Figure 8A:
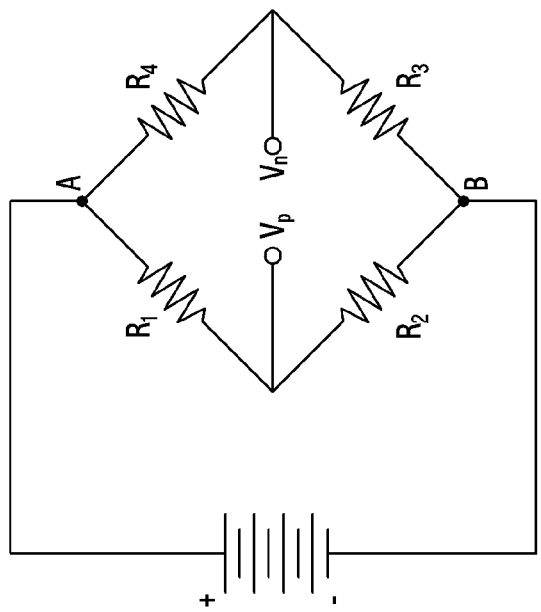
FIG. 8A is a diagram illustrating a partial area of a touch panel and force sensors disposed inside an electronic device according to an embodiment.
Figure 8A:
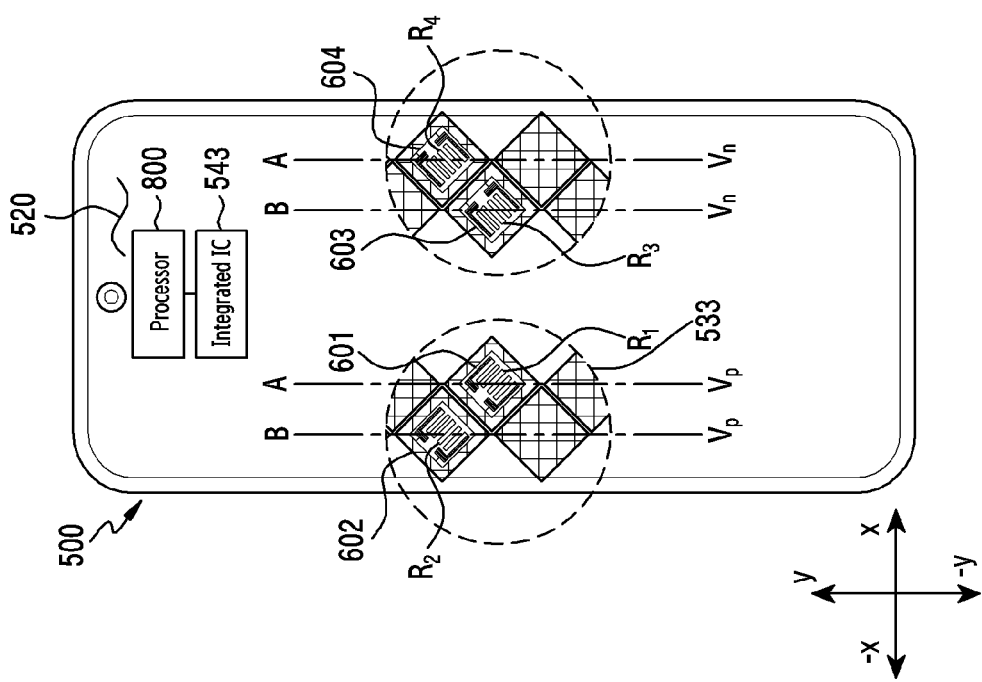
Figure 8B:
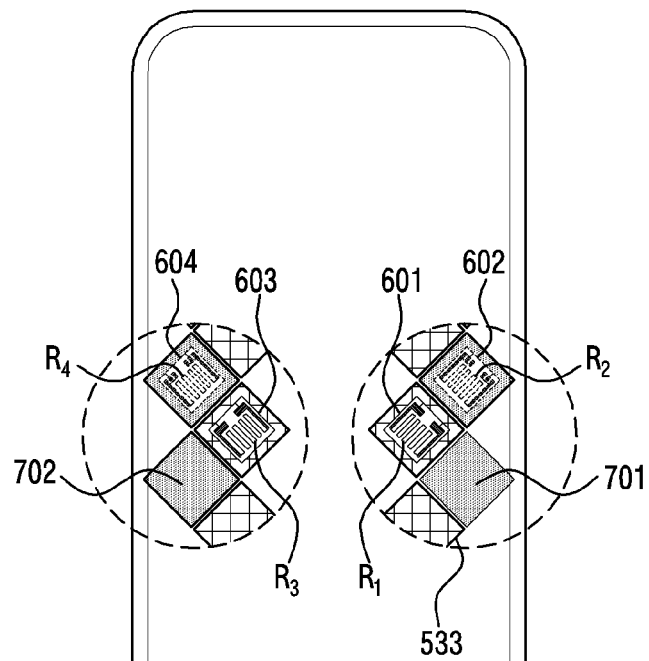
FIG. 8B is a diagram illustrating the rear surfaces of the force sensors of FIG. 8A according to an embodiment.

FIG. 8A is a diagram illustrating a partial area of a touch panel and force sensors disposed inside an electronic device according to an embodiment. FIG. 8B is a diagram illustrating the rear surfaces of the force sensors of FIG. 8A according to an embodiment. The dotted line area in FIG. 8A is an area viewed through the touch sensor 533 and the force sensors 600 disposed in the internal space of the electronic device.

Referring to FIGS. 8A and 8B, an electronic device 500 (e.g., the electronic device 500 in FIGS. 5A, 5B, 5C, and 5D) according to an embodiment may include a cover window 520 (e.g., the cover window 520 in FIGS. 5A, 5B, 5C, and 5D), a touch sensor 533 (e.g., the touch sensor 533 in FIG. 6), an integrated IC 543 (e.g., the integrated IC 543 in FIG. 6), a plurality of force sensors 600 (e.g., the plurality of force sensors 600 in FIG. 6), an adhesive member 700, and a processor 800 (e.g., the processor 120 in FIG. 1). The electronic device 500 according to an embodiment may be an electronic device to which a third force sensor 603 and a fourth force sensor 604 are added to the electronic device 500 of FIGS. 7A and 7B. Overlapping descriptions thereof will be omitted below.

According to an embodiment, the plurality of force sensors 600 may be disposed on the same layer as the touch sensor 533. In an example, the plurality of force sensors 600 may include a first force sensor 601, a second force sensor 602, a third force sensor 603, and a fourth force sensor 604. The first force sensor 601, the second force sensor 602, the third force sensor 603, and the fourth force sensor 604 may be disposed on the same layer, the first force sensor 601 may be disposed adjacent to the force sensor 602, and the third force sensor 603 may be disposed adjacent to the fourth force sensor 604. For example (e.g., see FIG. 8A), the first force sensor 601 and the second force sensor 602 may be disposed in an area adjacent to the left edge of the electronic device 500 (e.g., the edge in the −x direction in FIG. 8A), and the third force sensor 603 and the fourth force sensor 604 may be disposed in an area adjacent to a right edge of the electronic device 500 (e.g., the edge in the x direction in FIG. 8A). In this case, the first force sensor 601, the second force sensor 602, the third force sensor 603, and/or the fourth force sensor 604 may be disposed not to overlap each other.

In addition, the figure illustrates an embodiment in which the first force sensor 601, the second force sensor 602, the third force sensor 603, and/or the fourth force sensor 604 have the same shape and each of the first to fourth force sensors is constituted with one sensor, but the shape and/or number of first force sensors 601, second force sensors 602, third force sensors 603, and/or fourth force sensors 604 are not limited to the illustrated embodiment. According to another embodiment, at least one of the first force sensor 601, the second force sensor 602, the third force sensor 603, and/or the fourth force sensor 604 may have a different shape, and the number of first force sensors 601, the number of second force sensors 602, the number of third force sensors 603, and/or the number of fourth force sensors 604 may be different from each other.

According to an embodiment, the integrated IC 543 may be electrically connected to the first force sensor 601, the second force sensor 602, the third force sensor 603, and/or the fourth force sensor 604, and may apply a voltage to the first force sensor 601, the second force sensor 602, the third force sensor 603, and/or the fourth force sensor 604. In an example, the integrated IC 543 may detect a change in the resistance value $R_1$ of the first force sensor 601, a change in the resistance value $R_2$ of the second force sensor 602, a change in the resistance value $R_3$ of the third force sensor 603, and/or a change in the resistance value $R_4$ of the fourth force sensor 604 due to a pressure by using a Wheatstone bridge (e.g., a full bridge). In another example, the integrated IC 543 may detect the pressure applied to the first force sensor 601, the second force sensor 602, the third force sensor 603, and/or the fourth force sensor 604 based on the change in the sensed resistance value $R_1$ of the first force sensor 601, the resistance value $R_2$ of the second force sensor 602, the resistance value $R_3$ of the third force sensor 603, and/or the resistance value $R_4$ of the fourth force sensor 604. For example, when at least one of the resistance value $R_1$ of the first force sensor 601, the resistance value $R_2$ of the second force sensor 602, the resistance value $R_3$ of the third force sensor 603 or the resistance value $R_4$ of the fourth force sensor 604 changes, a potential difference may be formed between a first terminal (e.g., $V_p$ in FIG. 8A) branched from the first force sensor 601 and/or the second force sensor 602 and a second terminal (e.g., $V_n$ of FIG. 8A) branched from the third force sensor 603 and/or the fourth force sensor 604. The integrated IC 543 may detect the potential difference between the first terminal $V_p$ and the second terminal $V_n$ due to a change in at least one of the resistance value $R_1$ of the first force sensor 601, the resistance value $R_2$ of the second force sensor 602, the resistance value $R_3$ of the third force sensor 603, or the resistance value $R_4$ of the fourth force sensor 604. In addition, the integrated IC 543 may detect a pressure applied to the first force sensor 601, the second force sensor 602, the third force sensor 603, and/or the fourth force sensor 604 based on the detected potential difference between the first terminal $V_p$ and the second terminal $V_n$. Point A in FIG. 8A may be a point at which a voltage applied to the integrated IC 543 is branched to the first force sensor 601 and/or the fourth force sensor 604, and point B may be a point at which the voltage applied to the integrated IC 543 is branched to the second force sensor 602 and/or the third force sensor 603. In another example, the integrated IC 543 may be electrically connected to the touch sensor 533 to detect a change in capacitance of the electrode layers (e.g., the first electrode layer 5331 and the second electrode layer 5332 in FIG. 5A) of the touch sensor 533 according to a user's touch input. In another example, the integrated IC 543 may detect whether or not a user's touch input is input and/or a position (e.g., x, y coordinates) at which the user's touch input is input, based on the detected change in capacitance.

According to an embodiment, the adhesive member 700 may be attached only to at least one area of the rear surfaces (e.g., the surfaces in the −z direction of FIG. 6) of the plurality of force sensors 600. Referring to FIG. 8B, the adhesive member 700 (e.g., the adhesive member 700 in FIG. 7B) may include a first adhesive member 701 and a second adhesive member 702. In an example, the first adhesive member 701 may be attached only to the rear surface of the second force sensor 602, and the second adhesive member 702 may be attached only to the rear surface of the fourth force sensor 604.

In an example, since the first adhesive member 701 may be attached only to the rear surface of the second force sensor 602, and the second adhesive member 702 is attached only to the rear surface of the fourth force sensor 604, a space in which the second force sensor 602 and/or the fourth force sensor 604 are deformable or bendable may be reduced. In another example, an air layer may be provided on the rear surface of the first force sensor 601 and/or the rear surface of the third force sensor 603 without a separate adhesive member 700, so that the first force sensor 601 and/or the second force sensor 603 may be freely deformable or bendable compared to the second force sensor 602 and/or the fourth force sensor 604. Accordingly, when a pressure is applied to the first force sensor 601 and/or the second force sensor 602, the change in the resistance value $R_2$ of the second force sensor 602 may be small compared to the change in the resistance value $R_1$ of the first force sensor 601 to which the adhesive member 700 is not attached. In addition, when a pressure is applied to the third force sensor 603 and/or the fourth force sensor 604, the change in the resistance value $R_4$ of the fourth force sensor 604 may be small compared to the change in the resistance value $R_3$ of the first third sensor 603 to which the adhesive member 700 is not attached. Based on the change in the resistance value $R_1$ of the first force sensor 601, the resistance value $R_2$ of the second force sensor 602, the resistance value $R_3$ of the third force sensor 603, and/or the resistance value $R_4$ of the fourth force sensor 604, the processor 800 according to an embodiment may reduce a pressure detection error caused by a change in the resistance value of the first force sensor 601, the second force sensor 602, the third force sensor 603, and/or the fourth force sensor 604 due to a change in temperature, which will be described later. According to an embodiment, the processor 800 may be electrically or operatively connected to the integrated IC 543 electrically connected to the touch sensor 533 and/or the plurality of force sensors 600. In an example, the processor 800 may receive, from the integrated IC 543, information as to whether or not a user's touch input is input and/or data of a position at which the user's touch input is input, detected by the integrated IC 543. In another example, the processor 800 may receive, from the integrated IC 543, the pressure change amount data of the plurality of force sensors 600 detected by the integrated IC 543. For example, the processor 800 may receive the pressure change amount data of the first force sensor 601 and/or the pressure change amount data of the second force sensor 602 from the integrated IC 543. In an example, the processor 800 may detect a pressure applied to the cover window 520 based on the pressure change amount of the first force sensor 601, the pressure change amount of the second force sensor 602, the pressure change amount of the third force sensor 603, and/or the pressure change amount of the fourth force sensor 604 received from the integrated IC 543.

The change in the resistance value $R_1$ of the first force sensor 601, the resistance value $R_2$ of the second force sensor 602, the resistance value $R_3$ of the third force sensor 603, and/or the resistance value $R_4$ of the fourth force sensor 604 can be changed not only by a pressure but also by a temperature. For example, when the temperature around the electronic device 500 increases or a user's touch input is input, the resistance value $R_1$ of the first force sensor 601 and the resistance value $R_2$ of the second force sensor 602 may be changed. When a change in temperature (e.g., a user's touch input, a change in ambient temperature, or the like) occurs, the resistance value $R_1$ of the first force sensor 601, the resistance value $R_2$ of the second force sensor 602, the resistance value $R_3$ of the third force sensor 603, and/or the resistance value $R_4$ of the fourth force sensor 604 may be changed together. In contrast, when a pressure is applied to the cover window 520, the resistance value $R_1$ of the first force sensor 601 and the resistance value $R_3$ of the third force sensor 603 may be changed, but the resistance values $R_2$ and $R_4$ of the second and fourth force sensors 602 and 604, each of which have an adhesive member 700 attached to the rear surface thereof, may be hardly changed. Accordingly, in the electronic device 500 according to an embodiment, the second and fourth force sensors 602 and 604, which have the adhesive member 700 attached to the rear surfaces thereof, may be used as force sensors for detecting a pressure change due to a temperature, and the first and third force sensors 601 and 603, which do not have the adhesive member 700 attached to the rear surfaces thereof, may be used as force sensors for detecting a pressure change due to a touch input.

In an example, the processor 800 may increase the difference between the pressure change amounts of the first force sensor 601 and the second force sensor 602 and/or the difference between the pressure change amounts of the third force sensor 603 and the fourth force sensor 604 or exclude the effect of a temperature by processing (e.g., addition, subtraction, multiplication, or division) the pressure change amount of the first force sensor 601, the pressure change amount of the second force sensor 602, the pressure change amount of the third force sensor 603, and/or the pressure change amount of the fourth force sensor 604.

Figure 9:
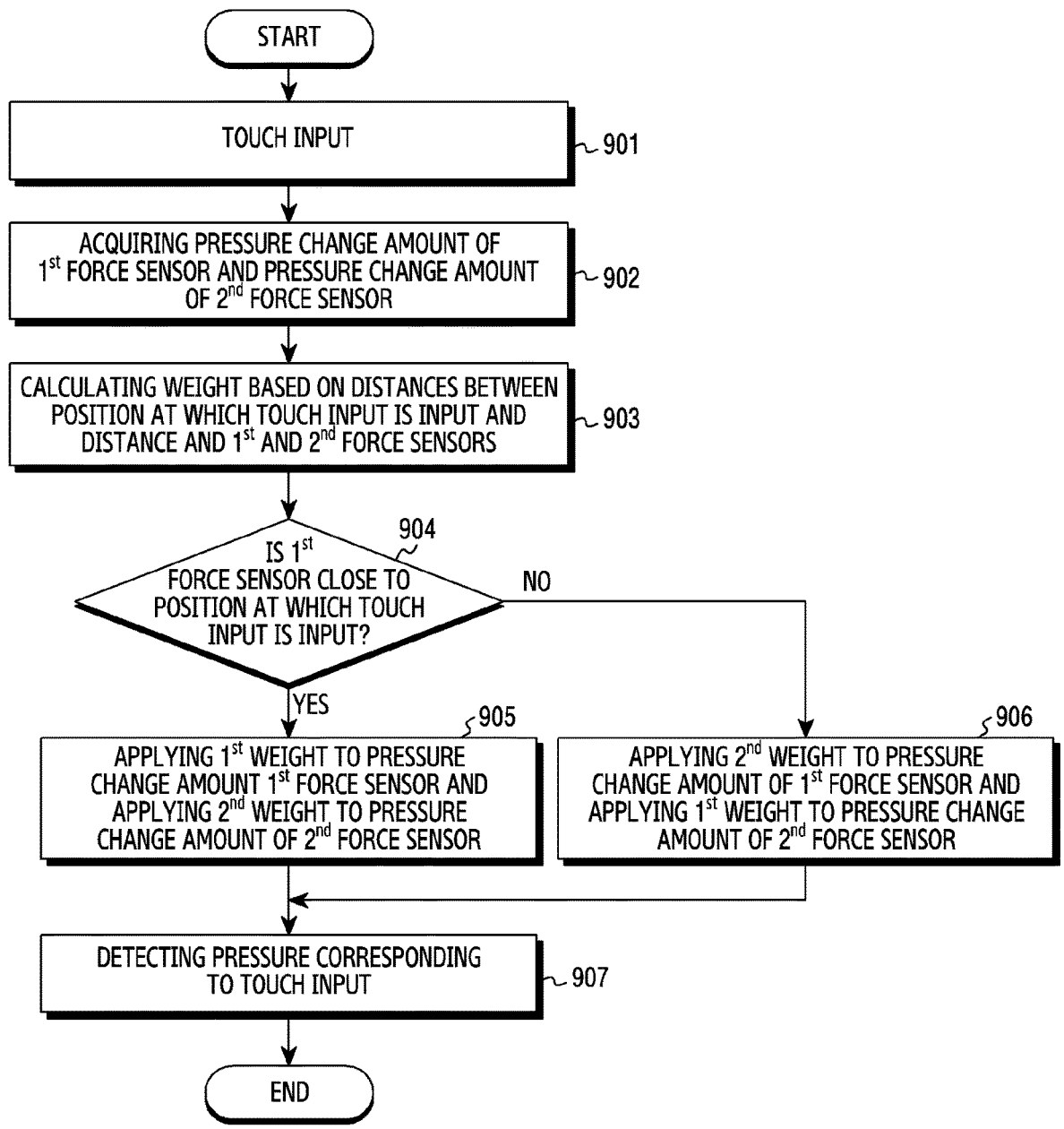
FIG. 9 is a flowchart illustrating a control operation of an electronic device depending on a position of a touch input according to an embodiment.
Figure 10:
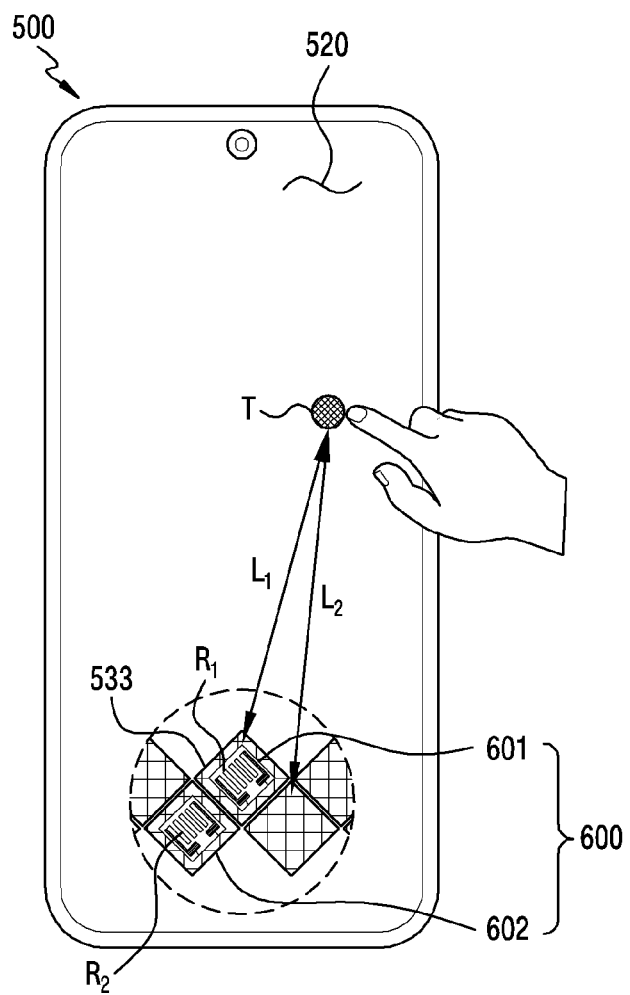
FIG. 10 is a diagram illustrating distances between a position at which a touch input is input and force sensors according to embodiment.

FIG. 9 is a flowchart illustrating a control operation of an electronic device depending a position of a touch input, according to an embodiment. FIG. 10 is a diagram illustrating distances between a position at which a touch input is input and force sensors according to an embodiment.

Hereinafter, the control operation of the electronic device of FIG. 9 will be described with reference to FIG. 10.

Referring to FIGS. 9 and 10, in operation 901, a user's touch input may be input via a cover window 520 (e.g., the cover window 520 in FIGS. 7A and 8A) of an electronic device 500 (e.g., the electronic device 500 in FIGS. 7A and 8A) according to an embodiment.

In operation 902, a processor (e.g., the processor 800 in FIGS. 7A and 8A) of the electronic device 500 according to an embodiment may acquire the pressure change amounts of a first sensor 601 (e.g., the first force sensor 601 in FIG. 7A) and a second force sensor 602 (e.g., the second force sensor 602 in FIG. 7A) by the user's touch input that is input in operation 901. For example, an integrated IC (e.g., the integrated IC 543 in FIGS. 7A and 8A) may be electrically connected to the first force sensor 601 and/or the second force sensor 602 to detect the pressure change amount of the first force sensor 601 and/or the pressure change amount of the second force sensor 602. As another example, the processor may be electrically connected to the integrated IC to receive the pressure change amount of the first force sensor 601 and/or the pressure change amount of the second force sensor 602 from the integrated IC. The above-described processor may acquire the pressure change amount of the first force sensor 601 and/or the pressure change amount of the second force sensor 602 via the integrated IC, but is not limited thereto. The processor of the electronic device 500 according to another embodiment may acquire the pressure change amount of a first force sensor 601 (e.g., the first force sensor 601 in FIG. 8A), the pressure change amount of a second force sensor 602 (e.g., the second force sensor 602 in FIG. 8A), the pressure change amount of a third force sensor 603 (e.g., third force sensor 603 in FIG. 8A), and/or the pressure change amount of a fourth force sensor 604 (e.g., the fourth force sensor 604 in FIG. 8A).

In operation 903, the processor of the electronic device 500 according to an embodiment may calculate distances between a position at which the user's touch input is input (e.g., the area T in FIG. 10) in operation 901 and the first and second force sensors 601 and 602, and may calculate, based on the calculated distances, weights to be applied to the pressure change amount of the first force sensor 601 and/or the pressure change amount of the second force sensor 602. In an example, when the user's touch input is input in operation 901, the processor may identify information (e.g., x, y coordinates) about the position T at which the touch input is input. The processor may calculate a distance $L_1$ between the position T at which the touch input is input and the first force sensor 601 and a distance $L_2$ between the position T at which the touch input is input and the second force sensor 602, and may calculate different weights depending on respective distances between the position T at which the touch input is input and the first and second force sensors 601 and 602. For example, a force sensor disposed at a position relatively close to the position T at which the touch input is input may be more affected by a temperature change that occurs when the user's touch input is input compared to a force sensor disposed at a position relatively distant the position T at which the touch input is input. Accordingly, as the distance between the position T at which the touch input is input and the force sensor (e.g., the first force sensor 601 or the second force sensor 602) is shorter, the value of the weight calculated by the processor according to an embodiment may be smaller. The processor of the electronic device 500 according to another embodiment may calculate distances between the position at which the user's touch input is input (e.g., the area T in FIG. 10) in operation 901 and the first force sensor 601, the second force sensor 602, the third force sensor (e.g., the third force sensor 603 in FIG. 8A), and the fourth force sensor (e.g., the fourth force sensor 604 in FIG. 8A), and may calculate, based on the calculated distances, weights to be applied to the pressure change amount of the first force sensor 601, the pressure change amount of the second force sensor 602, the pressure change amount of the third force sensor, and/or the pressure change amount of the fourth force sensor.

In operation 904, the processor of the electronic device 500 according to an embodiment may identify whether, of the first force sensor 601 and the second force sensor 602, the first force sensor 601 is the force sensor that is disposed at the position relatively close to the position T at which the touch input is input.

In operation 904, when the first force sensor 601 is identified as being the force sensor disposed at the position relatively close to the position T at which the touch input is input (e.g., $L_1<L_2$), in operation 905, the processor according to an embodiment may apply a first weight to the pressure change amount of the first force sensor 601 and apply a second weight different from the first weight to the pressure change amount of the second force sensor 602. In an example, the processor may apply the first weight calculated in operation 903 to the pressure change amount of the first force sensor 601 disposed at the position relatively close to the position T at which the touch input is input, and may apply the second weight greater than the first weight to the pressure change amount of the second force sensor 602 disposed at a position relatively distant from the position T at which the touch input is input.

In contrast, in operation 904, when the second force sensor 602 is identified as being the force sensor disposed at the position relatively close to the position T at which the touch input is input (e.g., $L_2<L_1$), in operation 906, the processor according to an embodiment may apply the second weight to the pressure change amount of the first force sensor 601 and apply the first weight to the pressure change amount of the second force sensor 602. In an example, the processor may apply the first weight to the pressure change amount of the second force sensor 602 disposed at the position relatively close to the position T at which the touch input is input, and may apply the second weight greater than the first weight to the pressure change amount of the first force sensor 601 disposed at a position relatively distant from the position T at which the touch input is input. According to another embodiment, the processor may apply a relatively smaller weight to the pressure change amount of a force sensor disposed at a position closer to the position at which the user's input is input (e.g., the area T in FIG. 10) among the first force sensor 601, the second force sensor 602, the third force sensor (e.g., the third force sensor 603 in FIG. 8A), and the fourth force sensor (e.g., the third force sensor 604 in FIG. 8A), and may apply a relatively greater weight to the pressure change amount of a force sensor disposed at a position more distant from the position at which the user's touch input is input. For example, when the third force sensor is disposed at a position more distant from the position at which the user's touch input is input compared to the fourth force sensor, the processor may apply a relatively greater weight to the pressure change amount of the third force sensor compared to the pressure change amount of the fourth force sensor.

The processor of the electronic device according to an embodiment may detect the magnitude of a pressure corresponding to the touch input that is input to the cover window 520 in operation 901 based on the pressure change amounts of the plurality of force sensors 600 (e.g., the pressure change amount of the first force sensor 601 and/or the pressure change amount of the second force sensor 602) to which the weights are applied through operation 905 and/or operation 906. In an example, the processor may detect the magnitude of a pressure corresponding to the touch input that is input to the cover window 520 by processing (e.g., addition, subtraction, multiplication, or division) the pressure changes amounts of the plurality of force sensors 600 (the pressure change amount of the first force sensor 601, the pressure change amount of the second force sensor 602, the pressure change amount of the third force sensor 603, and/or the pressure change amount of the fourth force sensor 604) to which the weights are applied.

The electronic device 500 according to an embodiment may reduce the effect of a temperature change occurring when the touch input is input in the process of pressure detection by detecting the pressure applied to the cover window 520 in consideration of the position at which the touch input is input through operation 901 and/or operation 907 described above. This may make it possible to improve the performance (e.g., sensitivity) of the force sensors 600 (e.g., the first force sensor 601 and the second force sensor 602).

Figure 11:
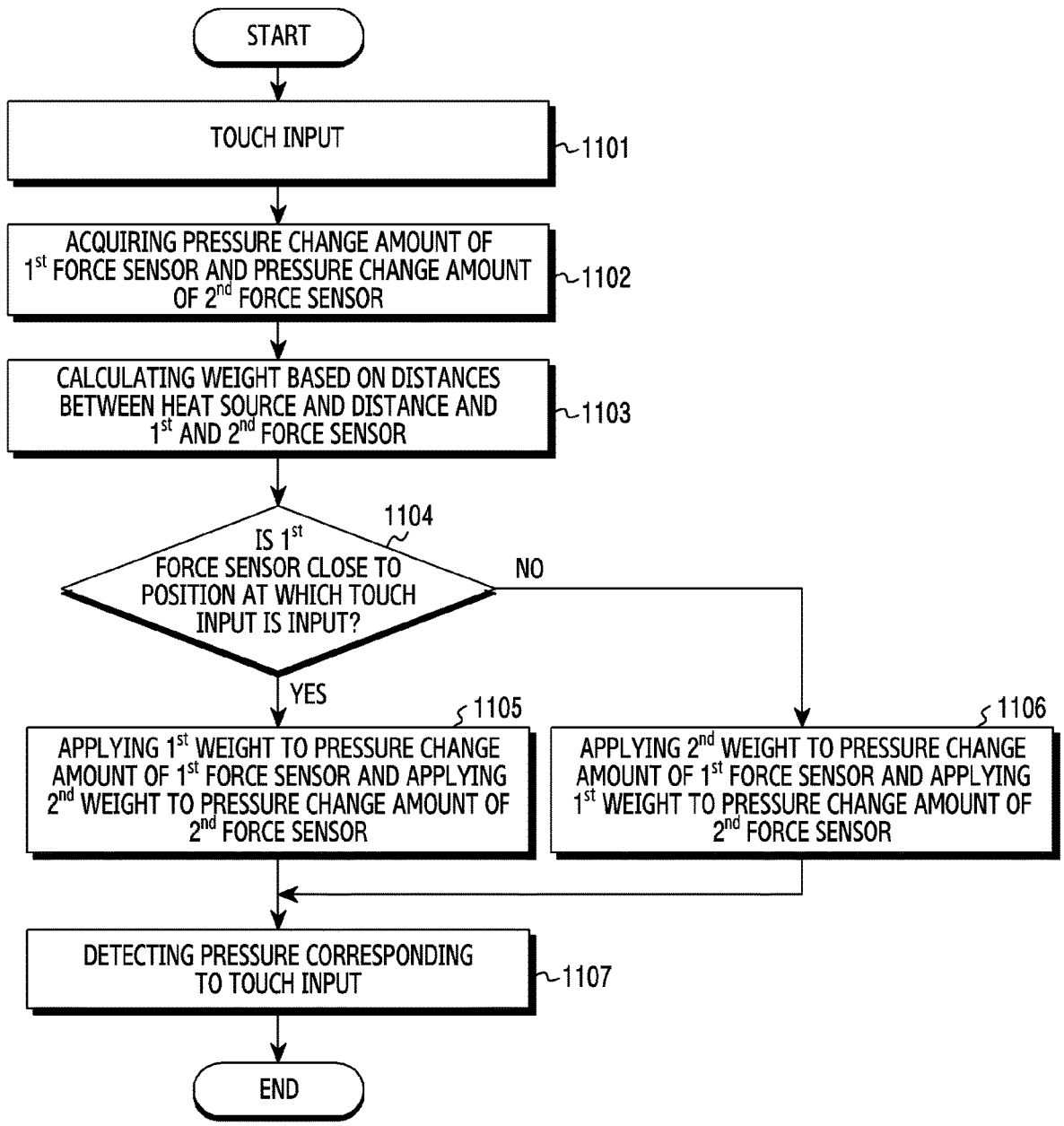
FIG. 11 is a flowchart illustrating a control operation of an electronic device depending on a position of a heat source according to an embodiment.
Figure 12:
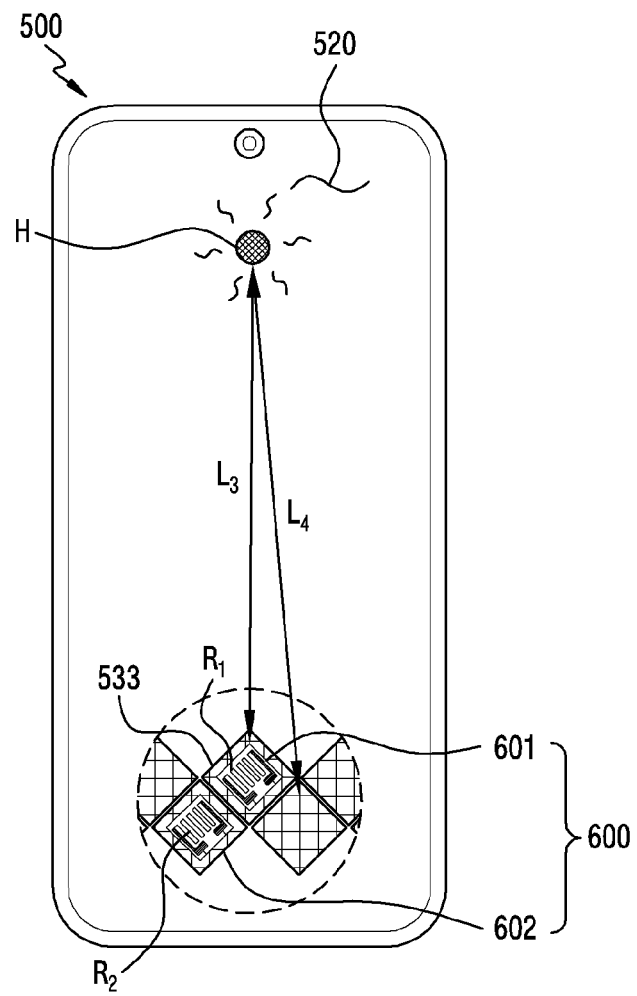
FIG. 12 is a diagram illustrating distances between a heat source inside an electronic device and force sensors according to an embodiment.

FIG. 11 is a flowchart illustrating a control operation of an electronic device depending on a position of a heat source, according to an embodiment. FIG. 12 is a diagram illustrating distances between the heat source inside the electronic device and force sensors according to an embodiment.

Hereinafter, the control operation of the electronic device of FIG. 11 will be described with reference to FIG. 12.

Referring to FIGS. 11 and 12, in operation 1101, a user's touch input may be input via a cover window (e.g., the cover window 520 in FIGS. 7A and 8A) of an electronic device 500 (e.g., the electronic device 500 in FIGS. 7A and 8A) according to an embodiment.

In operation 1102, a processor (e.g., the processor 800 in FIGS. 7A and 8A) of the electronic device 500 according to an embodiment may acquire the pressure change amounts of a first sensor 601 (e.g., the first force sensor 601 in FIG. 7A) and a second force sensor 602 (e.g., the second force sensor 602 in FIG. 7A) by the user's touch input that is input in operation 1101. For example, an integrated IC (e.g., the integrated IC 543 in FIGS. 7A and 8A) may be electrically connected to the first force sensor 601 and/or the second force sensor 602 to detect the pressure change amount of the first force sensor 601 and/or the pressure change amount of the second force sensor 602. As another example, the processor may be electrically connected to the integrated IC to receive the pressure change amount of the first force sensor 601 and/or the pressure change amount of the second force sensor 602 from the integrated IC. The above-described processor may acquire the pressure change amount of the first force sensor 601 and/or the pressure change amount of the second force sensor 602 via the integrated IC, but is not limited thereto. The processor of the electronic device 500 according to another embodiment may acquire the pressure change amount of a first force sensor 601 (e.g., the first force sensor 601 in FIG. 8A), the pressure change amount of a second force sensor 602 (e.g., the second force sensor 602 in FIG. 8A), the pressure change amount of a third force sensor 603 (e.g., third force sensor 603 in FIG. 8A), and/or the pressure change amount of a fourth force sensor 604 (e.g., the fourth force sensor 604 in FIG. 8A).

In operation 1103, the processor of the electronic device 500 according to an embodiment may calculate distances between a heat source (e.g., the area H in FIG. 12) inside the electronic device 500 and the first and second force sensors 601 and 602, and may calculate, based on the calculated distances, weights to be applied to the pressure change amount of the first force sensor 601 and/or the pressure change amount of the second force sensor 602. In an example, the processor may calculate the distance $L_3$ between the heat source H inside the electronic device 500 and the first force sensor 601 and the distance $L_4$ between the heat source H and the second force sensor 602, and may calculate weights different depending on respective calculated distances between the heat source H and the first and second force sensors 601 and 602. For example, a force sensor disposed at a position relatively close to the heat source H may be more affected by the temperature than a force sensor disposed at a position relatively distant from the heat source H. In an example, information on the disposed positions of electronic components each operating as a heat source H may be stored in a memory of the electronic device 500, and the processor may calculate, based on the information stored in the memory, the distances between the heat source H and the first and second force sensors 601 and 602. Accordingly, as the distance between the heat source H and the force sensor (e.g., the first force sensor 601 or the second force sensor 602) is shorter, the value of the weight calculated by the processor according to an embodiment may be smaller. In an example, the heat source H inside the electronic device 500 may include at least one of a processor, a memory (e.g., the memory 130 in FIG. 1), at least one integrated circuit (e.g., the display driver IC 541 in FIG. 6), an integrated IC 543, and a coil for wireless charging, but is not limited thereto. The processor of the electronic device 500 according to another embodiment may calculate distances between the heat source (e.g., the area H in FIG. 12) inside the electronic device and the first force sensor 601, the second force sensor 602, the third force sensor (e.g., the third force sensor 603 in FIG. 8A), and the fourth force sensor (e.g., the fourth force sensor 604 in FIG. 8A), and may calculate, based on the calculated distances, weights to be applied to the pressure change amount of the first force sensor 601, the pressure change amount of the second force sensor 602, the pressure change amount of the third force sensor, and/or the pressure change amount of the fourth force sensor.

In operation 1104, the processor of the electronic device 500 according to an embodiment may identify whether, of the first force sensor 601 and the second force sensor 602, the first force sensor 601 is the force sensor that is disposed at the position relatively close to the heat source H.

When the first force sensor 601 is identified as being the force sensor disposed at the position relatively close to the heat source H (e.g., $L_3<L_4$), in operation 1105, the processor according to an embodiment may apply a first weight to the pressure change amount of the first force sensor 601 and apply a second weight greater than the first weight to the pressure change amount of the second force sensor 602.

In contrast, when the second force sensor 602 is identified as being the force sensor disposed at the position relatively close to the heat source H (e.g., $L_4<L_3$), in operation 1106, the processor according to an embodiment may apply a second weight to the pressure change amount of the first force sensor 601 and apply a first weight smaller than the second weight to the pressure change amount of the second force sensor 602. According to another embodiment, the processor may apply a relatively smaller weight to the pressure change amount of a force sensor disposed at a position closer to the heat source H among the first force sensor 601, the second force sensor 602, the third force sensor (e.g., the third force sensor 603 in FIG. 8A), and the fourth force sensor (e.g., the third force sensor 604 in FIG. 8A), and may apply a relatively greater weight to the pressure change amount of a force sensor disposed at a position more distant from the heat source H. For example, when the third force sensor is disposed at a position more distant from the heat source H compared to the fourth force sensor, the processor may apply a relatively greater weight to the pressure change amount of the third force sensor compared to the pressure change amount of the fourth force sensor.

The processor of the electronic device according to an embodiment may detect the magnitude of a pressure corresponding to the touch input that is input to the cover window 520 in operation 1101 based on the pressure change amounts of the plurality of force sensors 600 (e.g., the pressure change amount of the first force sensor 601 and/or the pressure change amount of the second force sensor 602) to which the weights are applied through operation 1105 and/or operation 1106. In an example, the processor may detect the magnitude of a pressure corresponding to the touch input that is input to the cover window 520 through addition, subtraction, multiplication, or division of the pressure changes amounts of the plurality of force sensors 600 (the pressure change amount of the first force sensor 601, the pressure change amount of the second force sensor 602, the pressure change amount of the third force sensor 603, and/or the pressure change amount of the fourth force sensor 604) to which the weights are applied.

In the electronic device 500 according to an embodiment, the magnitude of the pressure applied to the cover window 520 may be detected in consideration of the temperature change occurring by the heat generation source H disposed inside the electronic device 500 through operation 1101 and/or operation 1107 described above, and as a result, the performance of the force sensors 600 (e.g., the first force sensor 601 and the second force sensor 602) may be improved.

Figure 13A:
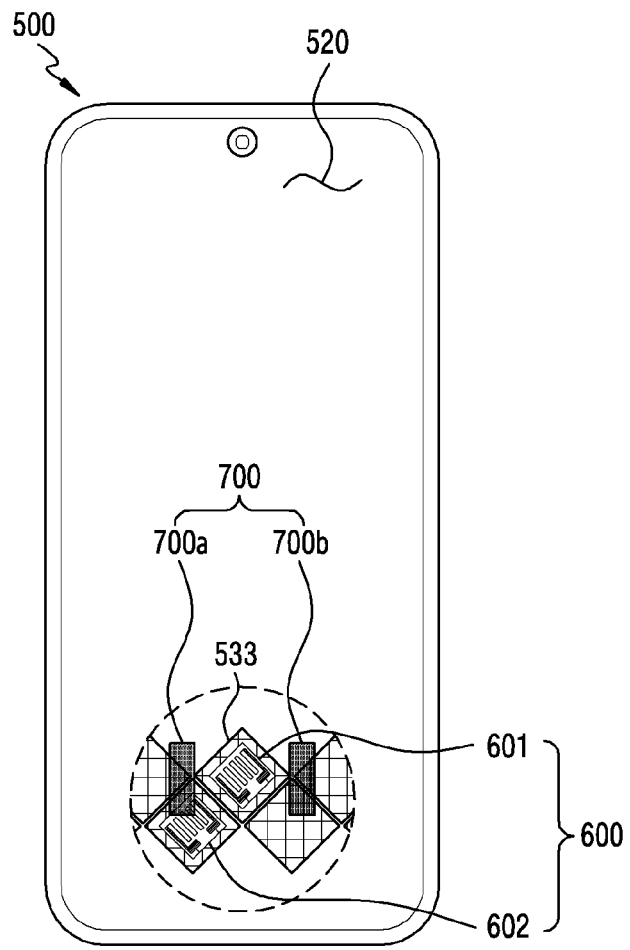
FIG. 13A is a diagram illustrating force sensors and adhesive members attached to the rear surfaces of the force sensors according to an embodiment.
Figure 13A:
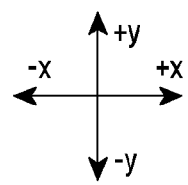
Figure 13B:
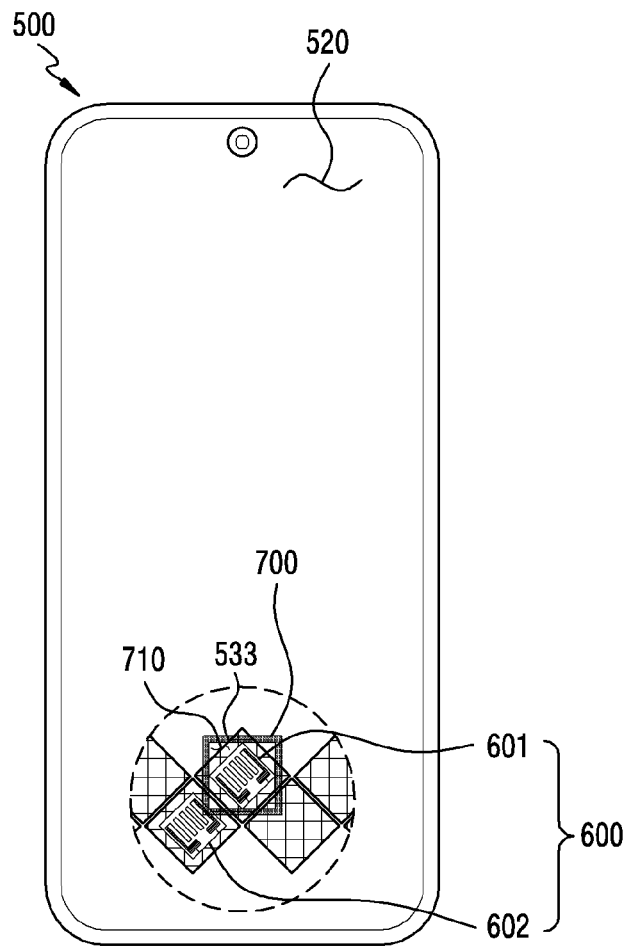
FIG. 13B is a diagram illustrating force sensors and adhesive members attached to the rear surfaces of the force sensors according to an embodiment.
Figure 13C:
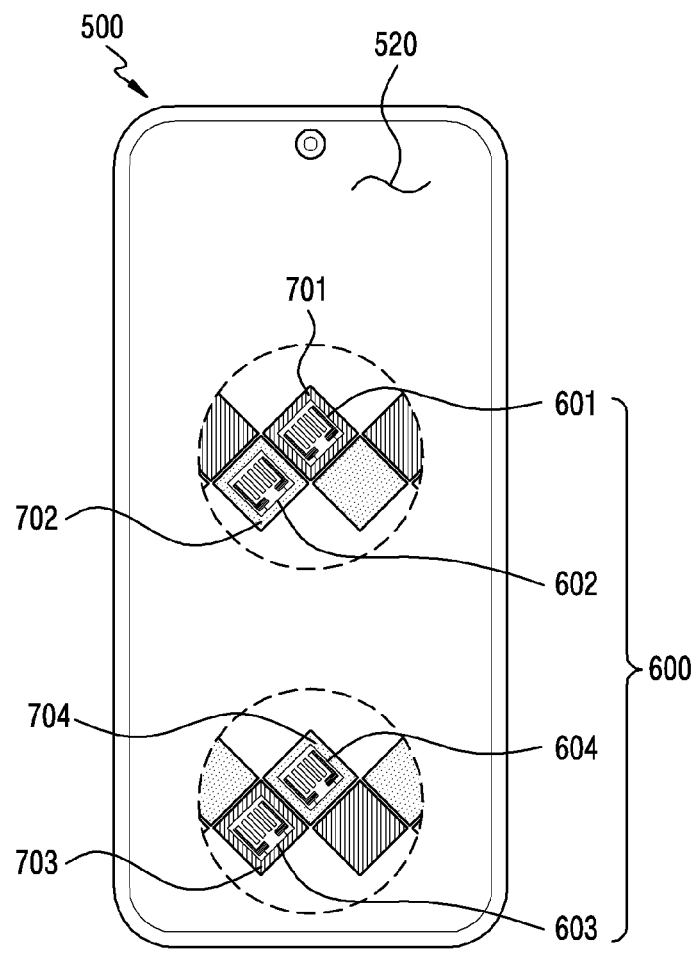
FIG. 13C is a diagram illustrating force sensors and adhesive members attached to the rear surfaces of the force sensors according to an embodiment.

FIG. 13A is a diagram illustrating force sensors and adhesive members attached to the rear surfaces of the force sensors according to an embodiment. FIG. 13B is a diagram illustrating force sensors and adhesive members attached to the rear surfaces of the force sensors according to an embodiment. FIG. 13C is a diagram illustrating force sensors and adhesive members attached the rear surfaces of the force sensors according to an embodiment.

Referring to FIGS. 13A, 13B, and 13C, an electronic device 500 (e.g., the electronic device 500 in FIGS. 7A and 8A) according to an embodiment may include a cover window 520 (e.g., the cover window 520 in FIGS. 7A and 8A), a touch sensor 533 (e.g., the touch sensor 533 in FIGS. 7A and 8A), a plurality of force sensors 600 (e.g., the plurality of force sensors 600 in FIG. 6), and adhesive members 700 (e.g., the adhesive members 700 in FIGS. 7B and 8B). In the electronic device 500 according to an embodiment, it is possible to improve the performance (e.g., sensitivity) of the plurality of force sensors 600 by modifying the disposition and/or shape of adhesive members 700 in the electronic device 500 of FIGS. 7A and 7B and/or the electronic device 500 of FIGS. 8A and 8B, and overlapping descriptions thereof will be omitted below.

Referring to FIGS. 13A and 13B, a plurality of force sensors 600 according to an exemplary embodiment may include a first force sensor 601 (e.g., the first force sensor 601 in FIG. 7A) and a second force sensor 602 (e.g., the second force sensor 602 in FIG. 7A) located on the rear surface of the cover window 520 and disposed in the same layer as the touch sensor 533. In an example, the first force sensor 601 and the second force sensor 602 may be disposed not to overlap each other.

According to an embodiment, at least one adhesive member 700 may be attached to at least one area of the rear surface (e.g., the surface in the −z direction of FIG. 6) of the first force sensor 601. The adhesive member 700 may be, for example, a double-sided tape, an OCA, a polymer adhesive, and/or a spacer, but is not limited thereto.

Referring to FIG. 13A, the adhesive member 700 according to an embodiment may include, with respect to the first force sensor 601, a left adhesive member 700a disposed in the left (e.g., the −x direction in FIG. 13A) area of the rear surface of the first force sensor 601 (e.g., the −x direction in FIG. 13A) and a right adhesive member 700b disposed in a right (e.g., the +x direction in FIG. 13A) area of the rear surface of the first force sensor 601. In an example, a separate adhesive member 700 may not be attached between the left adhesive member 700a and the right adhesive member 700b, and as a result, an empty space may be formed between the left adhesive member 700a and the right adhesive member 700b.

As the above-described left adhesive member 700a and right adhesive member 700b are attached to the rear surface of the first force sensor 601, the first force sensor 601 may be deformed or bent to a greater extent by an applied pressure compared to the case where the left adhesive member 700a and the right adhesive member 700b are not attached. Accordingly, the electronic device 500 according to an embodiment may use the first force sensor 601 that is greatly deformed by a pressure as a force sensor for pressure detection, and may use the second force sensor 602 that is relatively less deformed by a pressure as a force sensor for detecting a pressure change due to a temperature change. That is, in the electronic device 500 according to an embodiment, by increasing the difference between the pressure change amounts of the first force sensor 601 and the second force sensor 602 via the first force sensor 601 to which the left adhesive member 700a and the right adhesive member 700b are attached, it is possible to detect a pressure applied to the cover window 520 more precisely.

Referring to FIG. 13B, the adhesive member 700 according to another embodiment may be disposed on at least one area of the rear surface of the first force sensor 601. In an example, an opening 710 may be provided in at least one area corresponding to the first force sensor 601 among areas of the adhesive member 700. The above-described opening 710 may, for example, be formed in a quadrilateral shape in the area corresponding to the first force sensor 601. However, without being limited thereto, the opening 710 may have an oval shape or a polygonal shape other than a quadrilateral shape according to an embodiment.

As the adhesive member 700 including the above-described opening 710 is attached to the rear surface of the first force sensor 601, the first force sensor 601 may be deformed or bent to a greater extent by an applied pressure compared to the case where the adhesive member 700 is not attached. Accordingly, the electronic device 500 according to another embodiment may use the first force sensor 601 that is greatly deformed by a pressure as a force sensor for pressure detection, and may use the second force sensor 602 that is relatively less deformed by a pressure as a force sensor for detecting a pressure change due to a temperature change. That is, in the electronic device 500 according to another embodiment, by attaching, to the rear surface of the first force sensor 601, the adhesive member 700 including the opening 710 at a position corresponding to the first force sensor 601, it is possible to increase the difference between the pressure change amounts of the first force sensor 601 and the second force sensor 602 may be increased, and as a result, the electronic device 500 may detect the pressure applied to the cover window 520 more precisely.

Referring to FIG. 13C, a plurality of force sensors 600 according to another embodiment may include a first force sensor 601 (e.g., the first force sensor 601 in FIG. 8A)), the second force sensor 602 (e.g., the second force sensor 602 in FIG. 8A), a third force sensor 603 (e.g., the third force sensor 603 in FIG. 8A), and a fourth force sensor 604 (e.g., the fourth force sensor 604 of FIG. 8A), which are disposed on the same layer. In an example, the first force sensor 601 may be disposed adjacent to the second force sensor 602, and the third force sensor 603 may be disposed adjacent to the fourth force sensor 604.

The adhesive member 700 according to another embodiment may include a first adhesive member 701, a second adhesive member 702, a third adhesive member 703, and a fourth adhesive member 704. In an example, the first adhesive member 701 may be attached to the rear surface of the first force sensor 601 (e.g., the surface in the −z direction in FIG. 6), and the second adhesive member 702 may be attached to the rear surface of the second force sensor 602. In an example, the third adhesive member 703 may be attached to the rear surface of the third force sensor 603, and the fourth adhesive member 704 may be attached to the rear surface of the fourth force sensor 604. In an example, the first adhesive member 701 and/or the third adhesive member 703 may be formed of a material having a first rigidity. In another example, the second adhesive member 702 and/or the fourth adhesive member 704 may be formed of a material having a second rigidity greater than the first rigidity. For example, the first adhesive member 701 and/or the third adhesive member 703 may be formed of a material that is easily deformable by an external force (e.g., a pressure), and the second adhesive member 702 and/or the fourth adhesive member 704 may be formed of a material that is hardly deformed by an external force. In an electronic device 500 according to still another embodiment, a first adhesive member 701 and/or a third adhesive member 703, which are easily deformable by an external force, may be attached to the rear surface of the first force sensor 601 and/or the rear surface of the third force sensor 603, and the second adhesive member 702 and/or the fourth adhesive member 704, which are hardly deformable by an external force, may be attached to the rear surface of the second force sensor 602 and/or the rear surface of the fourth force sensor 604. In an electronic device 500 according to still another embodiment, a first force sensor 601 and/or a third force sensor 603, which are relatively greatly deformable by an applied pressure, may be used as a force sensor for detecting a pressure change, and a second force sensor 602 and/or the fourth force sensor 604, which are relatively less deformable by an applied pressure may be used as a sensor for detecting a pressure change due to a temperature change. That is, in the electronic device 500 according to still another embodiment, by attaching adhesive members 700 having different characteristics to the rear surfaces of the plurality of force sensors 600, it is possible to increase the difference between the pressure change amounts between the first and third force sensors 601 and 603 and the second and fourth force sensors 602 and 604, and to reduce the effect of the temperature change on the plurality of force sensors 600. As a result, the electronic device 500 according to still another embodiment may detect a pressure applied to the cover window 520 more precisely.

Figure 14A:
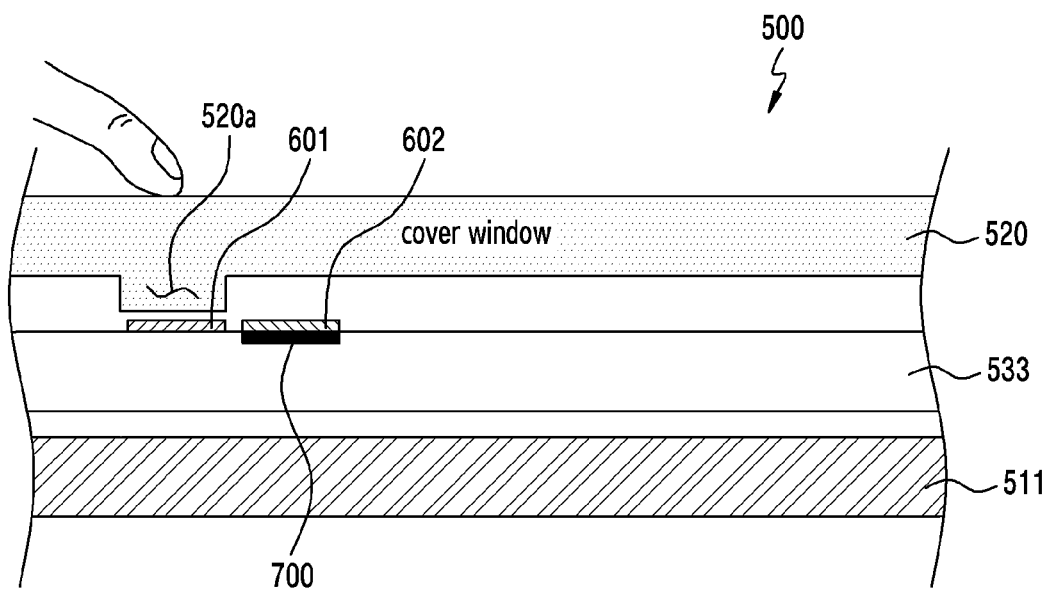
FIG. 14A is a diagram illustrating a structure of an electronic device for improving the sensitivity of force sensors according to an embodiment.
Figure 14B:
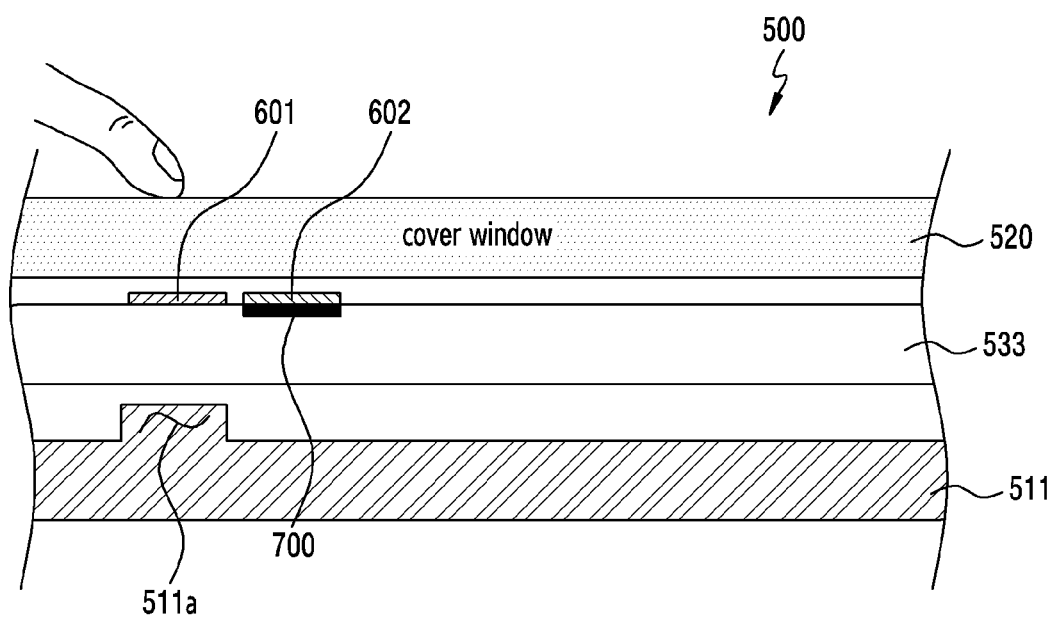
FIG. 14B is a diagram illustrating a structure of an electronic device for improving the sensitivity of force sensors according to an embodiment.
Figure 14C:
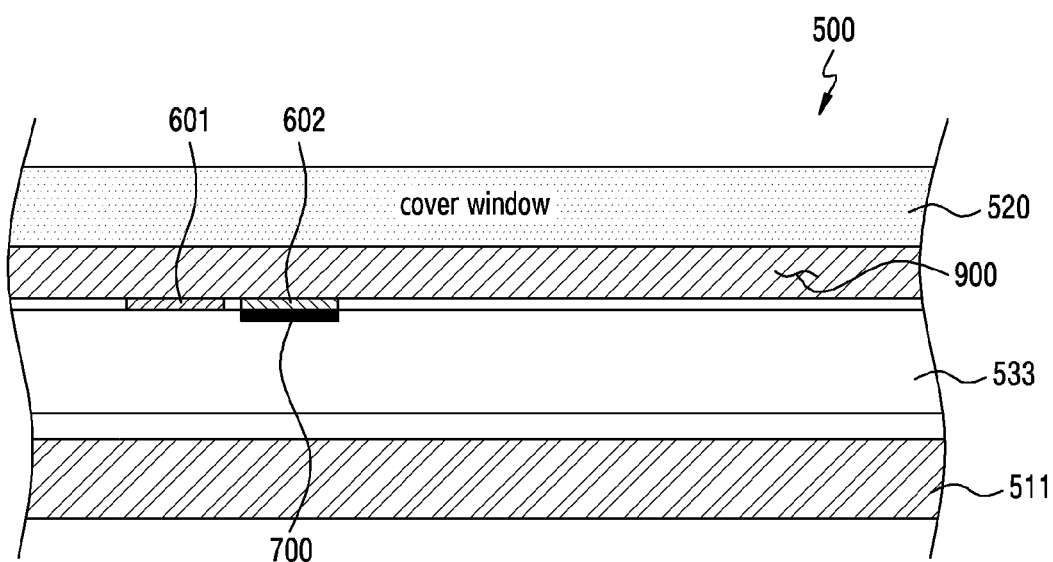
FIG. 14C is a diagram illustrating a structure of an electronic device for improving the sensitivity of force sensors according to an embodiment.

FIG. 14A is a diagram illustrating a structure of an electronic device for improving the sensitivity of force sensors according to an embodiment. FIG. 14B is a diagram illustrating a structure of an electronic device for improving the sensitivity of force sensors according to an embodiment. FIG. 14C is a diagram illustrating a structure of an electronic device for improving the sensitivity of force sensors according to an embodiment.

Referring to FIGS. 14A, 14B, and 14C, an electronic device 500 (e.g., the electronic device 500 in FIGS. 7A and 8A) according to various embodiments may include a bracket 511 (e.g., the first support member 441 in FIG. 4), a cover window 520 (e.g., the cover window 520 in FIGS. 7A and 8A), a touch sensor 533 (e.g., the touch sensor 533 in FIGS. 7A and 8A), a first force sensor 601 (e.g., the first force sensor 601 in FIG. 7A), a second force sensor 602 (e.g., the second force sensor 602 in FIG. 7A), and an adhesive member 700 (e.g., the adhesive member 700 in FIG. 7B). At least one of the components of the electronic device 500 according to various embodiments may be the same as or similar to at least one of the components of the electronic device 400 of FIG. 4, the electronic device 500 of FIGS. 7A and 7B, and/or the electronic device 500 of FIGS. 8A and 8B, and overlapping descriptions thereof will be omitted below.

According to an embodiment, the bracket 511 may define a space in which the electronic components of the electronic device 500 may be disposed, and may support electronic components disposed on at least one surface thereof. In an example, a touch sensor 533 may be disposed on at least one surface of the bracket 511, and the bracket 511 may support the touch sensor 533.

According to an embodiment, the first force sensor 601 and the second force sensor 602 may be disposed on the same layer as the touch sensor 533. In an example, an adhesive member 700 may be attached to at least one area of the bottom surface (or rear surface) of the second force sensor 602. Although only an embodiment in which the adhesive member 700 is attached to at least one area of the bottom surface of the second force sensor 602 is illustrated in the figure, in an electronic device 500 according to another embodiment, the adhesive member 700 may be omitted. Since the adhesive member 700 is attached to the bottom surface of the second force sensor 602, the second force sensor 602 may be deformed relatively less than the first force sensor 601 by a pressure applied to the cover window 620. Accordingly, the electronic device 500 according to an embodiment may use the second force sensor 602 that is hardly deformed by a pressure as a force sensor for detecting a pressure change due to a temperature change, and may use the first force sensor 601, which is easily deformed by a pressure compared to the second force sensor 602, as a force sensor for pressure detection.

In the electronic device 500 according to various embodiments, the structures of some components (e.g., the cover window 520 and the bracket 511) may be modified to improve the sensitivity of force sensors (e.g., the first force sensor 601 and the second force sensor 602).

Referring to FIG. 14A, in the electronic device 500 according to an embodiment, the sensitivity of the force sensors may be improved by modifying the structure of the cover window 520. In an example, the cover window 520 may include a first protrusion 520a provided to protrude from the rear surface of the cover window 520 toward the first force sensor 601. By disposing the first protrusion 520a of the cover window 520 at a position corresponding to the first force sensor 601, it is possible to cause the pressure applied to the cover window 520 to be transmitted to the first force sensor 601 more effectively. In an example, with the first protrusion 520a, it is possible to cause the first force sensor 601 to be more greatly deformed by the pressure applied to the cover window 520. That is, due to the first protrusion 520a of the cover window 520, it is possible to increase the difference between the pressure change amount of the first force sensor 601 and the pressure change amount of the second force sensor 602 due to the pressure applied to the cover window 520. As a result, in the electronic device 500 according to an embodiment, it is possible to reduce the effect of a temperature change in the pressure detection process, and thus it is possible to detect the pressure applied to the cover window 520 more precisely.

Referring to FIG. 14B, in an electronic device 500 according to another embodiment, the sensitivity of the force sensors may be improved by modifying the structure of the bracket 511. In an example, the bracket 511 may include a second protrusion 511a configured to protrude from one surface of the bracket 511 toward the first force sensor 601. In an example, the second protrusion 511a of the bracket 511 may be disposed at a position corresponding to the first force sensor 601, and may be able to increase the pressure change amount of the first force sensor 601 due to the pressure applied to the cover window 520 compared to the case where the second protrusion 511a is not disposed. For example, by disposing the second protrusion 511a of the bracket 511 on the left rear surface and/or right rear surface of the first force sensor 601 to be substantially the same as or similar to the adhesive member 700 of FIG. 13A, it is possible to increase the deformation or bending of the first force sensor 601 due to the pressure applied to the cover window 520. As another example, by disposing the second protrusion 511a of the bracket 511 in a band shape along the edge of the first force sensor 601 to be substantially the same as or similar to the adhesive member 700 of FIG. 13B, it may be possible to increase the deformation or bending of the first force sensor 601 due to the pressure applied to the cover window 520. As a result, it is possible to increase the difference between the pressure change amount of the first force sensor 601 and the pressure change amount of the second force sensor 602 due to the pressure applied to the cover window 520. That is, in the electronic device 500 according to another embodiment, it is possible to reduce the effect of the temperature change in the pressure detection process via the second protrusion 511a of the bracket 511, and consequently, it is possible to detect a pressure applied to the cover window 520 more precisely.

Referring to FIG. 14C, in an electronic device 500 according to still another embodiment, it is possible to improve the sensitivity via a heat dissipation sheet 900 disposed between the cover window 520 and the first and second force sensors 601 and 602. In an example, the resistance value of the first force sensor 601 and the resistance value of the second force sensor 602 may be changed by a temperature change. Accordingly, even if no pressure is applied to the cover window 520, a pressure change may be detected by the first force sensor 601 and/or the second force sensor 602 even when the temperature of the electronic device 500 changes. For example, when a user's touch input is input to the cover window 520, the temperature of the electronic device 500 may increase, and as a result, the first force sensor 601 and/or the second force sensor 602 may detect a pressure change. A change in the resistance value of the first force sensor 601 and/or the second force sensor 602 due to a temperature change may cause performance deterioration of the force sensors. Thus, in the electronic device 500 according to still another embodiment, it is possible to suppress performance deterioration of the force sensors due to a temperature change via the heat dissipation sheet 900. In an example, the heat dissipation sheet 900 may be disposed between the cover window 520 and the first force sensor 601 and/or the second force sensor 602 to prevent heat generated in the cover window 520 from being diffused to the force sensor 601 and/or the second force sensor 602. That is, in the electronic device 500 according to still another embodiment, it is possible to prevent heat from being diffused to the first force sensor 601 and/or the second force sensor 602 via the above-described heat dissipation sheet 900. Thus, it is possible to reduce the frequency of malfunction of the first force sensor 601 and/or the second force sensor 602 due to a temperature change.

An electronic device according to an embodiment of the disclosure (e.g., the electronic device 300 in FIG. 3A, the electronic device 400 in FIG. 4A, the electronic device 410 in FIG. 4B, or the electronic device 420 in FIG. 4C) may include: a cover window (e.g., the cover window 520 in FIGS. 5A and 7A) that defines the front surface of the electronic device, a first sensor (e.g., the first force sensor 601 in FIG. 7A) disposed under the cover window and configured to detect a pressure input to the cover window, a second sensor (e.g., the second force sensor 602 in FIG. 7A) disposed on the same layer as the first sensor and configured to detect the pressure input to the cover window, a first adhesive member (e.g., the adhesive member 700 in FIG. 7B and/or the second adhesive member 702 in FIG. 13C) attached to at least one area under the second sensor and formed of a material having a first rigidity, and a processor (e.g., the processor 800 of FIG. 7A) electrically connected to the first sensor and the second sensor, wherein the second sensor is less deformed than the first sensor by the pressure input to the cover window via the first adhesive member, and the processor is configured to: acquire a pressure change amount detected by the first sensor and a pressure change amount detected by the second sensor, and detect the pressure applied to the cover window based on the pressure change amount of the first sensor and the pressure change amount of the second sensor acquired by the processor.

In an example, the electronic device may further include a touch sensor (e.g., the touch sensor 533 in FIG. 6, FIG. 7A, and/or FIG. 7B) disposed on the same layer as the first sensor and the second sensor and configured to detect a touch input may be further included, wherein the processor may be electrically connected to the touch panel.

In an example, the processor may be configured to detect a position (e.g., T in FIG. 10) at which the touch input is input based on the touch input detected by the touch sensor, and detect the pressure applied to the cover window based on the position to which the detected touch input is input.

In an example, the processor may be configured to calculate a weight to be applied to the pressure change amount of the first sensor and the pressure change amount of the second sensor based on the position at which the touch input is input and a distance between the first sensor and the second sensor.

In an example, the processor may be configured to apply a first weight to the pressure change amount of a sensor disposed at a position relatively close to the position at which the touch input is input, of the first sensor and the second sensor, and apply a second weight different from the first weight to the pressure change amount of a sensor disposed at a position relatively distant from the position at which the touch input is input, of the first sensor and the second sensor.

In an example, the processor may be configured to detect the pressure applied to the cover window based on distances between the first and second sensors and a heat source (e.g., H in FIG. 12).

In an example, the processor may be configured to calculate a weight to be applied to the pressure change amount of the first sensor and the pressure change amount of the second sensor based on the distances between the heat source and the first and second sensors.

In an example, the processor may be configured to apply a first weight to the pressure change amount of a sensor disposed at a position relatively close to the heat source, of the first sensor and the second sensor, and apply a second weight different from the first weight to the pressure change amount of a sensor disposed at a position relatively distant from the heat source, of the first sensor and the second sensor.

In an example, the heat source may include at least one of the processor and at least one integrated circuit.

In an example, the electronic device may further include a third sensor (e.g., the third force sensor in FIGS. 8A and 8B) disposed on the same layer as the first sensor and the second sensor and configured to detect the pressure input to the cover window, and a fourth sensor (e.g., the fourth force sensor 604 in FIGS. 8A and 8B) disposed adjacent to the third sensor and configured to detect the pressure input to the cover window, wherein the first sensor, the second sensor, the third sensor, and the fourth sensor may be disposed on the same layer.

In an example, the electronic device may further include a second adhesive member (e.g., the fourth adhesive member 704 in FIG. 13C) attached to at least one area under the fourth sensor and formed of a material having the first rigidity, wherein the fourth sensor may be less deformed than the first sensor or the third sensor by the pressure input to the cover window thanks to the second adhesive member.

In an example, the electronic device may further include a third adhesive member (e.g., the first adhesive member 701 in FIG. 13C) attached to at least one area under the first sensor and having a second rigidity smaller than the first rigidity, and a fourth adhesive member (e.g., the third adhesive member 703 in FIG. 13C) attached to at least one area under the third sensor and having the second rigidity.

In an example, the cover window may include a first protrusion (e.g., the first protrusion 520a in FIG. 14A) protruding toward the first sensor, and the first protrusion may be configured to press the first sensor when the pressure is input to the cover window.

In an example, the electronic device may further include a heat dissipation sheet (e.g., the heat dissipation sheet 900 in FIG. 14C) located between the cover window and the first and second sensors.

In an example, the electronic device may further include a bracket (e.g., the bracket 511 in FIG. 14B) located under the first sensor and the second sensor, wherein the bracket may include a second protrusion (e.g., the second protrusion 511a in FIG. 14B) protruding toward the first sensor and configured to press the first sensor when the pressure is input to the cover window.

A method of controlling an electronic device according to an embodiment of the disclosure may include an operation of acquiring a pressure change amount of a first sensor (e.g., the first force sensor 601 in FIGS. 7A and 7B) disposed under a cover window (e.g., the cover window 520 in FIG. 7A), an operation of acquiring a pressure change amount of a second sensor (e.g., the second force sensor 602 in FIGS. 7A and 7B) disposed on the same layer as the first sensor and having an adhesive member (e.g., the adhesive member 700 in FIG. 7B) attached to the bottom thereof, and an operation of detecting a pressure applied to the cover window based on the pressure change amount of the first sensor and the pressure change amount of the second sensor acquired via a processor (e.g., the processor 800 in FIG. 7A) electrically connected to the first sensor and the second sensor.

In an example, the method may further include an operation of detecting a position (e.g., T in FIG. 10) at which a touch input is input based on the touch input detected by a touch sensor (e.g., the touch sensor 533 of FIG. 6, FIG. 7A, and/or FIG. 7B) disposed on the same layer as the first sensor and the second sensor, and an operation of calculating a weight to be applied to the pressure change amount of the first sensor and the pressure change amount of the second sensor based on the distances between the position at which the touch input is input and the first and second sensors.

In an example, the method may further include an operation of applying a first weight to the pressure change amount of a sensor disposed at a position relatively close to the position at which the touch input is input, of the first sensor and the second sensor, and an operation of applying a second weight larger than the first weight to the pressure change amount of a sensor disposed at a position relatively distant from the position at which the touch input is input, of the first sensor and the second sensor.

In an example, the method may further include an operation of calculating a weight to be applied to the pressure change amount of the first sensor and the pressure change amount of the second sensor based on the distance between a heat source (e.g., H in FIG. 12) and the first and second sensors.

In an example, the method may further include an operation of applying a first weight to the pressure change amount of a sensor disposed at a position relatively close to the heat source, of the first sensor and the second sensor, and an operation of applying a second weight different from the first weight to the pressure change amount of a sensor disposed at a position relatively distant from the heat source, of the first sensor and the second sensor.

With an electronic device according to an embodiment of the disclosure, it is possible to reduce the thickness of a force sensor and reduce the manufacturing cost of the force sensor.

In addition, with an electronic device according to an embodiment of the present disclosure, it is possible to precisely detect a pressure input to a display by detecting the pressure in consideration of a pressure change due to a temperature.

In the above-described specific embodiments of the disclosure, components included in the disclosure have been expressed in singular or plural terms according to the presented specific embodiments. However, the singular or plural terms are selected appropriately for the situation presented for convenience of description, and the disclosure is not limited to singular or plural constituent elements. A constituent element expressed using plural terms may be configured as a single element, or a constituent element expressed using a singular term may be configured as multiple elements.

In the detailed description of the disclosure, specific embodiments have been described, but various modifications are possible without departing from the scope of the disclosure. Therefore, the scope of the disclosure should not be limited to the described embodiments, but should be determined not only based on the claims described below, but also based equivalents to the claims.

What is claimed is:

1. An electronic device comprising:
a cover window defining a front surface of the electronic device;
a first sensor provided under the cover window and configured to detect a pressure applied to the cover window;
a second sensor provided on a same layer as the first sensor and configured to detect the pressure applied to the cover window;
a first adhesive member provided on only a second area of areas including a first area under the first sensor and the second area under the second sensor, wherein the first adhesive member at least partially supports the second sensor such that the second sensor above the first adhesive member is less deformed than the first sensor by the pressure applied to the cover window;
memory, including one or more storage media, storing instructions; and
at least one processor including processing circuitry,
wherein the instructions, when executed by the at least one processor individually or collectively, cause the electronic device to:
acquire a first pressure change amount detected by the first sensor and a second pressure change amount detected by the second sensor; and
detect the pressure applied to the cover window based on the first pressure change amount and the second pressure change amount.

2. The electronic device of claim 1, further comprising a touch sensor provided on the same layer as the first sensor and the second sensor and configured to detect a touch input.

3. The electronic device of claim 2, wherein the instructions, when executed by the at least one processor individually or collectively, further cause the electronic device to:
detect a position at which the touch input is input based on the touch input being detected by the touch sensor; and
detect the pressure applied to the cover window based on the position at which the touch input is input.

4. The electronic device of claim 3, wherein the instructions, when executed by the at least one processor individually or collectively, further cause the electronic device to determine a weight to be applied to the first pressure change amount and the second pressure change amount based on the position at which the touch input is input and a distance between the first sensor and the second sensor.

5. The electronic device of claim 4, wherein the instructions, when executed by the at least one processor individually or collectively, further cause the electronic device to:
apply a first weight to the first pressure change amount based on the first sensor being closer to the position at which the touch input is input than the second sensor; and
apply a second weight different from the first weight to the second pressure change amount based on the second sensor being farther from the position at which the touch input is input than the first sensor.

6. The electronic device of claim 1, wherein the instructions, when executed by the at least one processor individually or collectively, further cause the electronic device to detect the pressure applied to the cover window based on distances between the first sensor, the second sensor and a heat source.

7. The electronic device of claim 6, wherein the instructions, when executed by the at least one processor individually or collectively, further cause the electronic device to determine a weight to be applied to the first pressure change amount and the second pressure change amount based on the distances between the first sensor, the second sensor, and the heat source.

8. The electronic device of claim 7, wherein the instructions, when executed by the at least one processor individually or collectively, further cause the electronic device to:
apply a first weight to the first pressure change amount based on the first sensor being closer to the heat source than the second sensor; and
apply a second weight different from the first weight to the second pressure change amount based on the second sensor being farther from the heat source than the first sensor.

9. The electronic device of claim 7, wherein the heat source comprises at least one of the at least one processor and at least one integrated circuit.

10. The electronic device of claim 1, further comprising:
a third sensor configured to detect the pressure applied to the cover window; and
a fourth sensor provided adjacent to the third sensor and configured to detect the pressure applied to the cover window,
wherein the first sensor, the second sensor, the third sensor, and the fourth sensor are provided on the same layer.

11. The electronic device of claim 10, wherein the first adhesive member has a first rigidity,
wherein the electronic device further comprises:
a second adhesive member provided on at least one area under the fourth sensor and having the first rigidity, and
wherein the fourth sensor is less deformed than the first sensor or the third sensor by the pressure applied to the cover window.

12. The electronic device of claim 11, further comprising:
a third adhesive member provided on at least one area under the first sensor and having a second rigidity that is less than the first rigidity; and
a fourth adhesive member provided at least one area under the third sensor and having the second rigidity.

13. The electronic device of claim 1, wherein the cover window comprises a first protrusion protruding toward the first sensor, and
wherein the first protrusion presses the first sensor due to the pressure input to the cover window.

14. The electronic device of claim 1, further comprising:
a heat dissipation sheet provided between the cover window and at least one of the first sensor and the second sensor.

15. The electronic device of claim 1, further comprising a bracket provided under the first sensor and the second sensor,
wherein the bracket comprises a second protrusion protruding toward the first sensor and configured to press the first sensor due to the pressure input to the cover window.

* * * * *